United States Patent [19]
Yokote

[11] Patent Number: 6,138,140
[45] Date of Patent: *Oct. 24, 2000

[54] DATA PROCESSING METHOD AND DEVICE

[75] Inventor: Yasuhiko Yokote, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,288

[22] Filed: Jul. 11, 1996

[30] Foreign Application Priority Data

Jul. 14, 1995 [JP] Japan .................................... 7-178625

[51] Int. Cl.[7] .............................. G06F 9/06; G06F 15/177
[52] U.S. Cl. ................................. 709/203; 713/1
[58] Field of Search ..................................... 395/651, 652, 395/682, 683, 685, 680, 200.31, 200.32, 200.33, 200.38; 709/201, 202, 203, 302, 305; 713/1, 2, 100; 379/93.19, 93.25, 110.01

[56] References Cited

U.S. PATENT DOCUMENTS

| | | | |
|---|---|---|---|
| 5,195,130 | 3/1993 | Weiss et al. | 379/93.19 |
| 5,347,632 | 9/1994 | Filepp et al. | 395/200.33 |
| 5,377,259 | 12/1994 | Butler et al. | 379/93.25 |
| 5,381,534 | 1/1995 | Shi | 395/200.33 |
| 5,423,042 | 6/1995 | Jalili et al. | 395/684 |
| 5,555,411 | 9/1996 | England et al. | 713/2 |
| 5,630,066 | 5/1997 | Gosling | 395/200.09 |
| 5,797,010 | 8/1998 | Brown | 713/2 |
| 5,815,661 | 9/1998 | Gosling | 395/200.46 |

FOREIGN PATENT DOCUMENTS 0 718 761  6/1996  European Pat. Off. .

OTHER PUBLICATIONS

Motorola Technical Developments, vol. 18, Mar. 1993, Schaumburg, IL., pp. 91–93, XP000349572, Gregory L. Cannon et al: "Downloadable Pager Functionality".

IBM Technical Disclosure Bulletin, vol. 36, No. 12, Dec. 1993, New York, pp. 651–654, XP000419101, "Incremental Compilation for Interpretative Language Translator".

Yasuhiko Yokote, Fumio Teraoka, and Mario Tokoro, Inter–Object Communications in the Muse Object–Oriented Operating System, SCSL–TR–88–002, SCSL, appeared in 5th Conference Proceedings of Japan Society for Software and Technology, in Japanese, Sep., 1988.

Yasuhiko Yokote, Fumio Teraoka, and Mario Tokoro, Object Management in the Muse Object–Oriented Operating System, SCSL–TR–88–001, SCSL, appeared in 5th Conference Proceedings of Japan Society for Software Science and Technology, in Japanese, Sep., 1988.

Yasuhiko Yokote, Fumio Teraoka, and Mario Tokoro, A Reflective Architecture for an Object–Oriented Distributed Operating System, SCSL–TR–89–001, SCSL, appeared in Proceedings of European Conference on Object–Oriented Programming '89, Mar., 1989.

(List continued on next page.)

*Primary Examiner*—Dung C. Dinh
*Attorney, Agent, or Firm*—Frommer Lawrence & Haug, LLP.; William S. Frommer; Gordon Kessler

[57] ABSTRACT

A data processing method for a data processing system having: a server comprising an application program constructed from a plurality of objects, an execution environment constructed from a plurality of objects for specifying operations of the application program and an application program interface for specifying an interface between the application program and the execution environment; and a client for being downloaded with the application program from the server, the data processing method comprising the steps of:

having the server execute a check whether or not the client has the execution environment for the application environment to be downloaded when the application program is to be downloaded to the client; and having the server download the application program to the client in accordance with the results of the check.

67 Claims, 20 Drawing Sheets

OTHER PUBLICATIONS

Fumio Teraoka, Yasuhiko Yokote, and Mario Tokoro, Muse–IP: A Network Layer Protocol for Large Distributed Systems with Mobile Hosts, SCSL–TR–89–003, SCSL, appeared in Proceedings of the 4th Joint Workshop on Computer Communications, Jun., 1989.

Yasuhiko Yokote, Fumio Teraoka, Masaki Yamada, Hiroshi Tezuka, and Mario Tokoro, The Design and Implementation of the Muse Object–Oriented Distributed Operating System, SCSL–TR–89–010, SCSL, appeared in Proceedings of First Conference on Technology of Object–Oriented Languages and Systems, Oct., 1989.

Fumio Teraoka, Yasuhiko Yokote, Atsushi Mitsuzawa, and Mario Tokoro, Location Transparent Inter–Object Communication in the Muse Operating System, SCSL–TR–90–001, SCSL, in Japanese, Apr., 1990.

Fumio Teraoka, Yasuhiko Yokote, and Mario Tokoro, Virtual Network: Towards Location Transparent Communication in Large Distributed Systems, SCSL–TR–90–005, SCSL, appeared in Proceedings of 5th International Workshop on Computer Communications, Jun., 1990.

Nobuyuki Fujinami, Yasuhiko Yokote, Fumio Teraoka, Atsushi Mitsuzawa, and Mario Tokoro, Real–time Scheduling Facilities for the Muse Operating System, SCSL–TR–90–007, SCSL, in Japanese, Aug., 1990.

Yasuhiko Yokote and Mario Tokoro, Muse: An Operating System for Building a Next Generation Computing Environment, SCSL–TR–90–001, SCSL, appeared in Computer Systems Symposium in 1991, in Japanese, Jan., 1991.

Yashiko Yokote, Fumio Teraoka, Atsushi Mitsuzawa, Nobuhisa Fujinami, and Mario Tokoro, The Muse Object Architecture: A New Operating System Structuring Concept, SCSL–TR_91–002, SCSL, appeared in Operating Systems Review, vol. 25, No. 2, Apr., 1991, Feb., 1991.

Fumio Teraoka, Yasuhiko Yokote, and Mario Tokoro, A Network Architecture Providing Host Migration Transparency, SCSL–TR–91–004, SCSL, appeared in Proceedings of SIGCOMM'91 Symposium, Communications Architecture & Protocols, Sep., 1991.

Yashiko Yokote, Atsushi Mitsuzawa, Nobuhisa Fujinami, and Mario Tokoro, Reflective Object Management in the Muse Operating System, SCSL–TR–91–009, SCSL, Sep., 1991.

Yashiko Yokote, Atsushi Mitsuzawa, Nobuhisa Fujinami, and Mario Tokoro, Evaluation of Muse Reflective Object management, SCSL–TM–91–019, SCSL, presented at the 8th Conference of Japan Society for Software Science and Technology (in Japanese), Sep., 1991.

Nobuhisa Fujinami and Yasuhiko Yokote, Naming and Addressing of Objects without Unique Identifiers, SCS-L–TR–92–004, SCSL, in Proceedings of the 12th International Conference on Distributed Computing Systems, Jun., 1992.

Yasuhiko Yokote, The Apertos Reflective Operating System: The Concept and Its Implementation, SCSL–TR–92–014, SCSL, appeared in the Proceedings of the Conference on Object–Oriented Programming, Systems, Languages, and Applications 1992, Oct., 1992.

Takao Tenma, Yasuhiko Yokote, and Mario Tokoro, Implementating Persistent Objects in the Apertos Operating System, SCSL–TR–91–015, SCSL, appeared in the Proceedings of Object Orientation in Operating System 1992, Sep., 1992.

Yasuhiko Yokote, Kernel Structuring for Object–Oriented Operating Systems: The Apertos Approach, SCSL–TR–93–014, SCSL, appeared in Proceedings of the International Symposium on Object Technologies for Advanced Software (ISOTAS), Nov., 1993.

Jun–ichiro Itoh and Yasuhiko Yokote, Concurrent Object–Oriented Device Driver Programming in Apertos Operating System, SCSL–TM–94–005, Jun., 1994.

Roger Lea, Ysuhiko Yokote, and Jun–ichiro Itoh, Adaptive Operating System Design Using Reflection, SCSL–TR–95–038, SCSL, appeared in Proceedings of HTOS'95, Orcas Island, WA USA. Mar. 1995, Mar., 1995.

Jun–ichiro Itoh, Yasuhiko Yokote, and Mario Tokoro, SCONE: A New Execution Model for Low–Level System Programming based on Concurrent Objects, SCSL–TM–95–006, SCSL, 1995 (no paper available).

Jun–ichiro Itoh, Roger Lea, and Yasuhiko Yokote, Using Meta–Objects to Support Optimisation in the Apertos Operating System, SCSL–TM–95–007, SCSL, appeared in USENIX Conference on Object Oriented Tehcnologies (COOTS), Jun., 1995.

Kenichi Murata, R. Nigel Horspool, Eric G. Manning, Yasuhiko Yokote, and Mario Tokoro, Unification of Active and Passive Objects in an Object–Oriented Operating System, SCSL–TR–95–025, SCSL, appeared in Proceedings of 1995 International Workshop of Object Orientation in Operating Systems (IWOOOS'95 ), Aug., 1995.

Kenichi Murata, R. Nigel Horspool, Eric G. Manning, Yasuhiko Yokote, and Mario Tokoro, Unification of Compile–time and Run–time Metaobject Protocols, SCSL–TR–095–026, appeared in ECOOP Workshop in Advances in Metaobject Protocols and Reflection (Meta'95), Aug., 1995.

Jun–ichiro Itoh, Yasuhiko Yokote, and Mario Tokoro, SCONE: Using Concurrent Objects for Low–Level Operating Systems Programming, SCSL–TR–95–028, SCSL, appeared in Proceedings of the ACM 00PSLA95, Oct., 1995.

Jun–ichiro Itoh, Yashiko Yokote, and Michel Feret, A New Software Architecture for Evolvable Multimedia Software, first appeared in ECMAST96 Proceedings in 1996, revised in the European Transactions on Telecommunications in 1997.

Hideaki Okamura and Yasuhiko Yokote, Customization of Application Object Execution by System Object Downloading in Embedded Operating Systems, Nov., 1998.

Yasuhiko Yokote, Michel Feret, and Jun–ichiro Itoh, A New Software Architecture for Evolvable Multimedia Software, presented at proceedings of ECMAST '96 Louvain, Belgium, May 28–30, 1996.

Yasuhiko Yokote and Mario Tokoro, Concurrent Programming in ConcurrentSmalltalk, first appeared in Object–Oriented Concurrent Programming, Edited by Akinori Yonezawa and Mario Tokoro, 1987, The MIT Press.

Orient 84/K: An Object–Oriented Concurrent Programming Language for Knowledge Representation, first appeared in Object–Oriented Concurrent Programming, Edited by Akinori Yonezawa and Mario Tokoro, 1987, The MIT Press.

Sony's Response to DAVIC's Third Call for Proposals on the Concept of Virtual Machines, Berlin, Germany, Dec. 11–15, 1995.

application program configuration concurrent object structure structure of client environment suitable for applications and dynamic restructuring.

MK : Micro Kernel
MVM : Micro Virtual Machine structure of system functions logical structure of MVM and MK logical structure of Context and Descriptor overall structure of MVM

FIG. 17

| type | description |
|---|---|
| T_INVALID | invalid entry |
| T_PRIMITIVE | The value field denotes a primitive object, which is a dependent object on MVM |
| T_POINTTER | The value field contains a pointer to an object | type of variable table entry

FIG. 18

| class | P_CLASS | P_BODY | description |
|---|---|---|---|
| Integer | P_INTEGER | immediate | integer number |
| Float | P_FLOAT | immediate | IEEE 754 32bits floating point number |
| Double Float | P_DFLOAT | immediate | IEEE 754 64bits floating point number |
| Boolean | P_BOOLEAN | immediate | TRUE or FALSE |
| String | P_STRING | address to heap | sequence of UNICODE characters |
| Array | P_ARRAY | address to heap | sequence of data of the same type |
| Context | P_CONTEXT | CName | representation of object execution |
| Jump | P_JUMP | I-code index | target address to which execution resumes |
| Pointer | P_POINTER | address to memory | adress |
| Assign | P_ASSIGN | n/a | duplication of a variable entry |
| Mailer | P_MAILER | n/a | invocation of a method |
| Undef | P_UNDEF | n/a | undefined primtive object | primitive object

FIG. 19

19-1
```
struct Message {
  long length ;
  any body [ ];
};
exception outrange {long position} ;
exception overflow {} ;
exception undef {int primitive; int selector} ;
exception zerodiv {} ;

Interface Integer {
  Integer operator+(in Integer value)
    raise(overflow);
  Integer operator-(in Integer value)
    raise(overflow);
  Integer operator*(in Integer value);
  Integer operator/(in Integer value)
    raise(zerodiv);
  Integer remainder(in Integer value);
  Integer and(in Integer value);
  Integer or(in Integer value);
  Integer xor(in Integer value);
  Integer not(void);
  Integer operator=(in Float value);
  Integer operator=(in DoubleFloat value);
  Boolean opetator<(in Integer value);
  Boolean opetator<=(in Integer value);
  Boolean opetator==(in Integer value);
};
interface Float {
  Float operator+(in Float value)
    raise (overflow, underflow);
  Float operator-(in Float value)
    raise (overflow, underflow);
  Float operator*(in Float value)
    raise (overflow, underflow);
  Float operator/(in Float value)
    raise (overflow, underflow, zerodiv);
  Float operator=(in Integer value);
  Float operator=(in DoubleFloat value);
    raise (overflow);
  Boolean opetator<(in Float value);
  Boolean opetator<=(in Float value);
  Boolean opetator==(in Float value);
``` primitive object interface

FIG. 20

```
19-2
interface DoubleFloat{
        DoubleFloat operator+(in DoubleFloat value)
                raise(overflow, underflow);
        DoubleFloat operator-(in DoubleFloat value)
                raise(overflow, underflow);
        DoubleFloat operator*(in DoubleFloat value)
                raise(overflow, underflow);
        DoubleFloat operator/(in DoubleFloat value)
                 raise(overflow, underflow, zerodiv);
        DoubleFloat operator=(in Float value)
                raise( );
        Boolean operator<(in DoubleFloat value)
                raise( );
        Boolean operator<=(in DoubleFloat value)
                raise( );
        Boolean operator==(in DoubleFloat value)
                raise( );
};
interface Boolean {
        Boolean not (void)
};
interface String {
        String operator+(in String string);
        String substring(in Integer position, in Integer length);
                raise(outrange);
        Integer length(void);
};
interface Array {
        void put (in Integer Index, in any value);
                raise(outrange);
        any get (in Integer Index)
                raise(outrange);
        Integer length (void);
};
interface Context {
    ...accessers...
};
interface Jump {
        void eval (void)
                raise(outrange);
        void evalT (Boolean cond)
                raise(outrange);
        void evalF (Boolean condition)
                raise(outrange);
};

primitive object interface (continued)
```

FIG. 21

19-3
```
interface Pointer {
        void put (in Address pos, in byte value)
             exception outrange;
        byte get (in Address pos)
             exception outrange;
        void put (in Address pos, in word value)
             exception outrange;
        word get (in Address pos)
             exception outrange;
        void put (in Address pos, in long value)
             exception outrange;
        long get (in Address pos)
             exception outrange;
        void put (in Address pos, in longlong value)
             exception outrange;
        longlong get (in Address pos)
             exception outrange;
};
interface Assing{
        void operator=(in int position1, in int position2);
interface Mailer{
        void call(in ID target, Integer select, in Message msg);
        void reply( );
};
interface undef
};
``` primitive object interface (continued)

FIG. 22

| name | description |
|------|-------------|
| OP_M | execute the operation specified by the first argument. This operation is processed either by personality or by a primitive object. (operands:operation, number of operands,...) |
| OP_R | give control back to the object when the operation requested by OP_M returns (operands:target, return arguments) |

I-code instruction set

FIG. 23 interface MetaCore{
    mcError M (in long method, in Message msg);
    mcError R (in CName ctxt, in long method, in Message msg);

Micro Kernel Interface

DATA PROCESSING METHOD AND DEVICE

BACKGROUND OF THE INVENTION

The present invention relates to a data processing method and device and more particularly to a low-cost data processing method and device of a simple structure.

Recently, personal computers have become widespread, with these personal computers being used to access prescribed servers via a network so that prescribed information can be obtained.

Application programs are necessary for carrying out various processes with these kinds of personal computers. Each user purchases application programs which can operate with the operating system (hereinafter referred to as "OS") of their personal computer and installs and uses these application programs directly from a recording medium or via a communications line.

An idea for determining whether or not a client is appropriate while an application program is being installed via a communications line has been disclosed in Japanese Laid-open Patent No. Hei. 1-15253612. However, the object of this was to determine whether or not the user of the client computer is a regular user, with compatibility between the program and the computer not being determined in the related art at the time of installation of the program.

When OSs are different, the application program is also different, with each user then selecting and purchasing application programs in line with their own OS. The application providers (application designers) also then have to design a number (equal to the number of OSs) of application programs for carrying out what is essentially the same process, which involves a great deal of labor while at the same time increases costs.

A similar problem also occurs with application programs having the same OS. Namely, two application programs have to be designed separately even when both of these application programs are operating on the same OS when one of these application programs is different from the other application program. This makes the amount of effort and cost involved in providing a single application program high.

As the present invention sets out to resolve these kind of problems, it is the object of the present invention to provide single application programs simply and at a low cost independently of the type of computer.

SUMMARY OF THE INVENTION

According to the data processing method of the present invention, a server checks whether or not a client has an execution environment for an application environment to be downloaded when the application program is to be downloaded to the client and the server downloads the application program to the client in accordance with the results of the check.

Further, the application program is executed using a method for interpreting and executing the application program converted to intermediate code and a method for dynamically compiling the intermediate code and executing generated binary code. For example, when compiling is difficult, the intermediate code can be interpreted and executed gradually.

A data processing device of the present invention is provided with a checker for checking whether or not the client has an execution environment for the application program to be downloaded when the application program is to be downloaded to the client and a downloader for downloading the application program to the client in accordance with checking results of the checker.

This data processing device can further comprise a notifier for giving notification with relation to the execution environment for the application program to be downloaded when the application program is to be downloaded from the server and a downloader for downloading the application program from the server in accordance with the notification results of the notifier.

This data processing device can still further comprise a first executor for interpreting and executing the application program converted into intermediate code, a binary code generator for dynamically compiling the intermediate code and generating binary code and a second executor for executing the binary code and the system object. For example, when compiling is difficult, the intermediate code can be interpreted and executed gradually.

BRIEF DESCRIPTION OF THE DRAWINGS

FIG. 17 is a view showing the type of Variable table entry;

FIG. 18 is a view showing a primitive object list and interface name;

FIG. 19 is a view showing a primitive object interface;

FIG. 20 is a view showing a continuation of the primitive object interface in FIG. 19;

FIG. 21 is view showing a continuation of the primitive object interface in FIG. 20;

FIG. 22 is a view showing an I-code instruction set; and

FIG. 23 is a view showing an MK interface.

DETAILED DESCRIPTION OF THE PREFERRED EMBODIMENTS

First Embodiment

Figure 1:
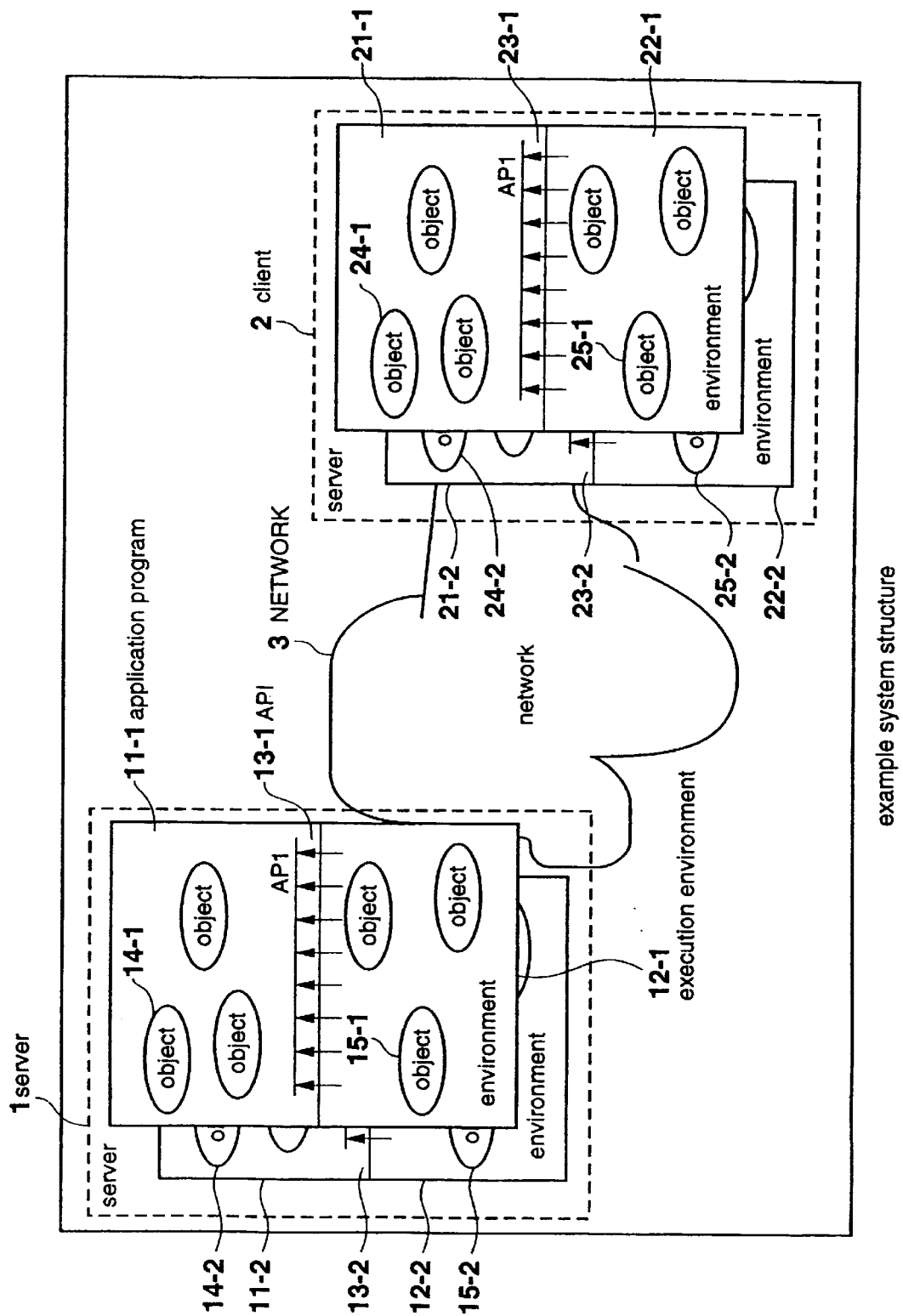
FIG. 1 is a view of an example system structure to which the data processing method of the present invention is applied.

FIG. 1 shows an example of a system structure to which the data processing method of the present invention is applied. The system comprises a server 1 (data processing device), a client 2 (data processing device) and a network 3.

In this embodiment, the server 1 has two application programs 11-1 and 11-2. One of the application programs 11-1 has an execution environment 12-1 for defining the environment of execution of the application program 11-1 and an application program interface (hereinafter referred to as "API") 13-1 comprising an interface between the application program 11-1 and the execution environment 12-1.

The application program 11-1 comprises a plurality of objects 14-1 and the execution environment 12-1 comprises a plurality of objects 15-1.

The application program 11-2 also has an execution environment 12-2 defining the environment for this application program 11-2 and an API 13-2 functioning as an interface between the application program 11-2 and the execution environment 12-2.

Further, the application program 11-2 also comprises a plurality of objects 14-2 and the execution environment 12-2 comprises a plurality of objects 15-2.

The client 2 also has two application programs 21-1 and 21-2. The application program 21-1 has an execution environment 22-1 for defining the environment for this application program 21-1, and an API 23-1 as an interface between the application program 21-1 and the execution environment 22-1. The application program 21-1 comprises a plurality of objects 24-1 and the execution environment 22-1 comprises a plurality of objects 25-1.

The application program 21-2 also has an execution environment 22-2 defining the environment for the application program 21-2 and an API 23-2. The application program 21-2 comprises a plurality of objects 24-2 and the execution environment 22-2 comprises a plurality of objects 25-2.

The objects are all defined as concurrent objects which are processed concurrently with other objects. A plurality of APIs exist in the server 1 and the client 2 because one API set can be considered as one execution environment.

Figure 2:
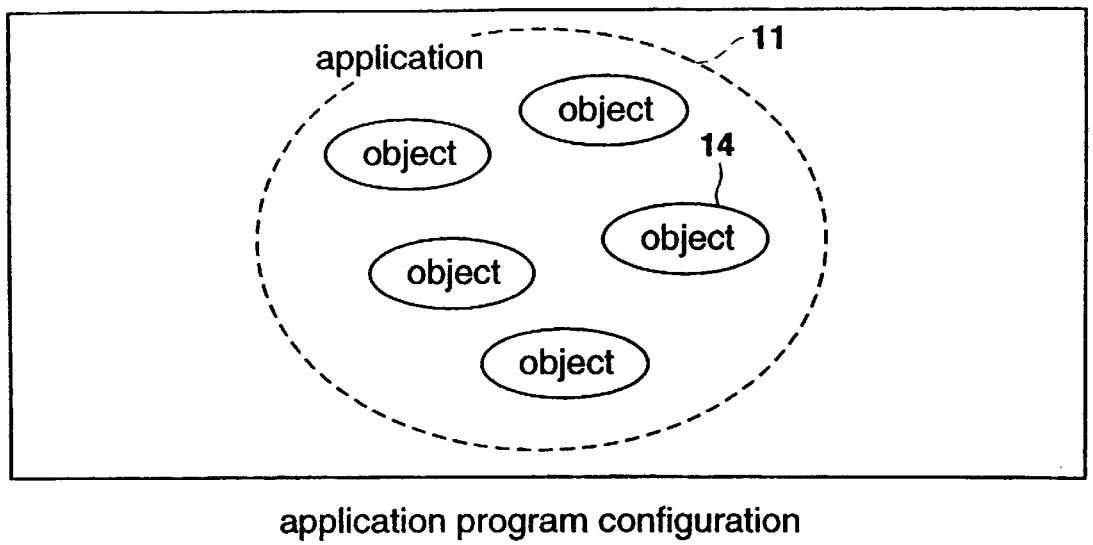
FIG. 2 is a view showing a structure of an application program.

As shown in FIG. 1 and FIG. 2, the application program 11 comprises a plurality of objects 14 gathered together. Further, execution speed is increased by having the application program 11 processed concurrently by constructing the object 14 as a concurrent object. Because the object 14 is a replacement unit, objects with operational bugs or objects with performance problems etc. can be replaced with objects which do not have errors. Problems of the objects 14 can therefore be resolved without having to remodel the whole of the application program 11. Further, a new application program can be easily made by taking the object 14 as a part and combining the object 14 with an object taken as a part of an already existing application program.

This application program is a single service unit, and can be, for example, an application program for; only displaying image data from the server 1; retrieving image data using an VCR function; selecting a service using a menu; home shopping; a family account book linked with home shopping; tax calculations, etc.

Operativity for common features can then be obtained by sharing application programs between objects. For example, an editor for inputting data to a family account book application program and an editor for inputting data in a home shopping program can be shared.

Figure 3:
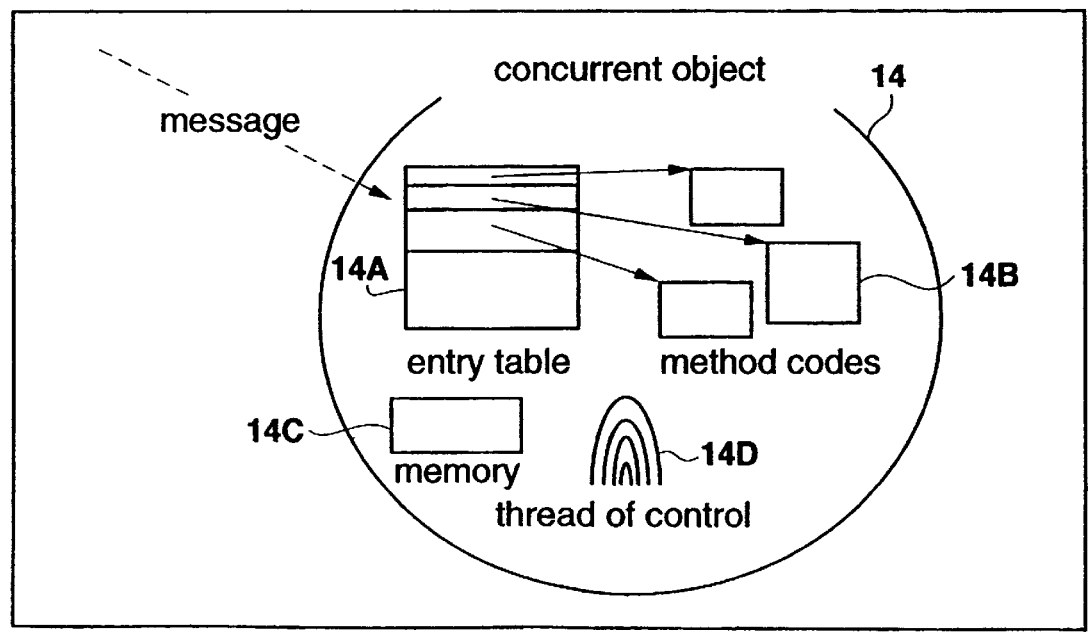
FIG. 3 is a view showing a structure of a concurrent object.

Next, a description of a concurrent object will be given, with the configuration of the concurrent object being shown in FIG. 3. The object 14 which is a concurrent object comprises a method entry table 14A open to the outside public, a method code 14B, a memory area 14C for holding the object conditions and a simple thread 14D for executing the method. Only one execution context (also referred to as a "thread") exists at the concurrent object 14. The concurrent object 14 therefore receives one message and does not process messages arriving during the processing of this message until execution of this message which is currently being processed is completed.

Only providing one thread within the object has the following benefits.

(1) It is not necessary to be concerned about synchronization between a plurality of activities. Namely, it is no longer necessary to carry out such a process as to determine a sequence of access to the shared data using an instruction for synchronizing such as semaphore when shared data exists. In other words, the sequence of the message transmission to the object determines the sequence of access.

(2) As a result of this, program errors due to mistakes in the way of obtaining synchronization no longer occur and reusability of the object is improved.

(3) Synchronization errors can be prevented in a majority of cases by providing, for example, a device driver using this method.

(4) Device drivers can safely be replaced because synchronization errors due to replacing of the device drivers can also be prevented.

(5) Portions for the device driver other than portions for actually controlling the hardware can be provided independently from the OS. The program development period can therefore be made shorter because the amount of time taken up on program development for the device drivers can be shared.

(6) The description relating to execution control between objects can be removed from the description of the application program. For example, it is usually necessary for a thread execution control program to be incorporated within the application program with, for example, a method employing multi threads (when a plurality of threads are used). It is then necessary to rewrite the application program when the thread programming environment changes. However, if there is only one thread as in the present invention, it is not necessary to describe this portion at the application program. The application program therefore does not have to be rewritten even if the execution control method changes. The most appropriate execution control method for putting this concurrent object in this execution environment is provided by a system using dynamic expansion theory for objects.

(7) It is therefore not necessary to consider parallel processing when describing an application program. If concurrent objects are programmed, the system then carries out parallel processing with the hardware under the most appropriate execution control automatically after this because concurrent objects are the parallel processing units. In the related art, the generation of a number of processes or the generation of a number of threads had to be designated during programming. If this designation is made without taking into consideration the performance of the hardware, the application program then becomes dedicated to specific hardware.

Figure 4:
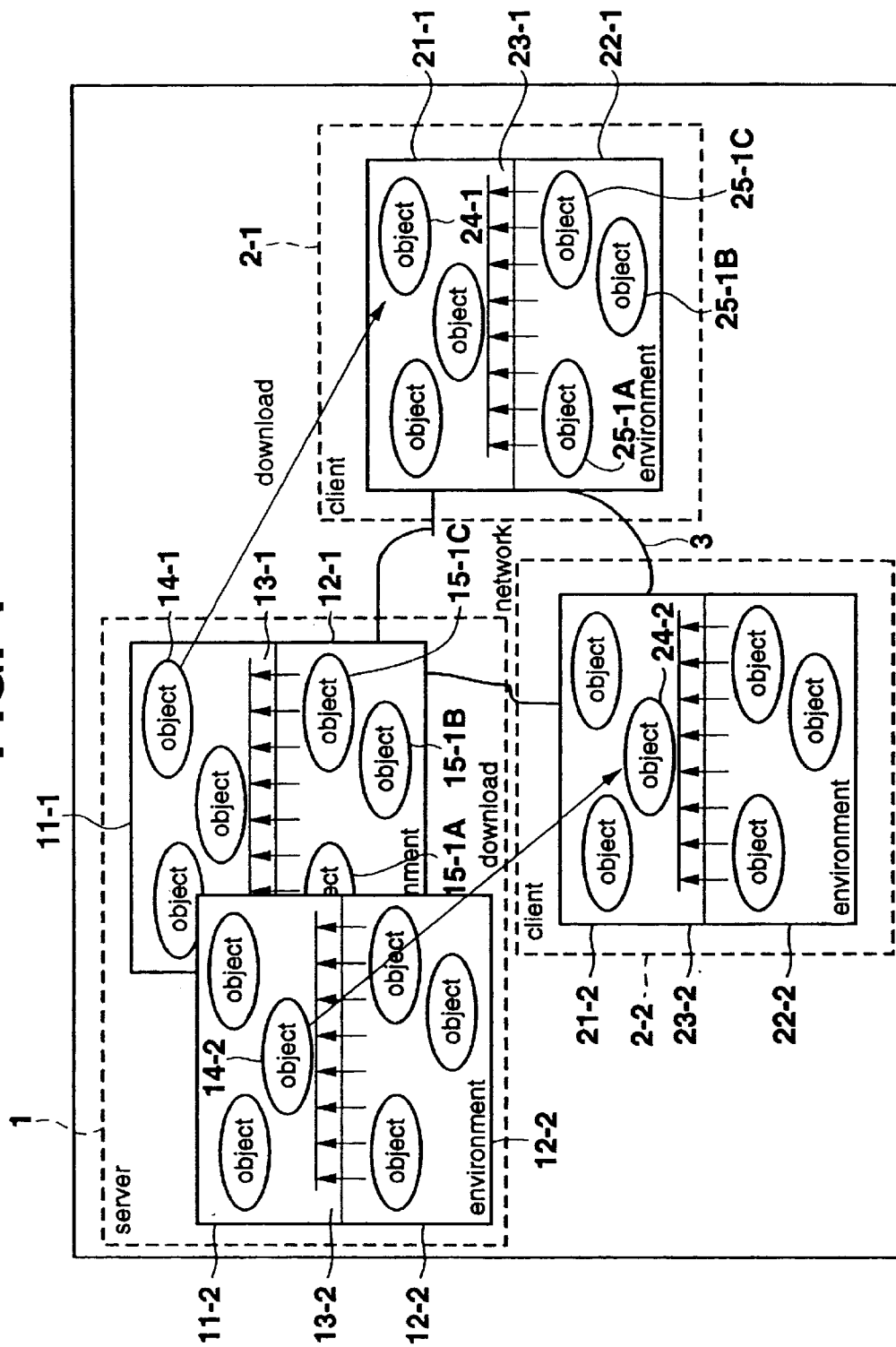
FIG. 4 is a view describing the downloading of objects from the server to clients of a plurality of vendors.

With this system, the object is downloaded as necessary. An example of a system for downloading objects from the server 1 to the clients 2 of a plurality of vendors is shown in FIG. 4. Clients API 13 (13-1, 13-2) to be used by the respective vendors are realized by the execution environments 12 (12-1, 12-2).

When an object is downloaded to the client 2 (2-1, 2-2) it is determined whether or not an execution environment 22 (22-1, 22-2) the same as the execution environment 12 on the server 1 exists on the client 2. If the same execution environment does exist, the object is downloaded. If not, downloading is carried out after an execution environment 22 the same as the execution environment 12 on the server 1 is constructed.

For example, in FIG. 4, when the object 14-1 of the application program 11-1 of the server 1 is downloaded as the object 24-1 of the application program 21-1 of the client 2-1, an object 25-1A corresponding to an object 15-1A of the execution environment 12-1 of the server 1 is necessary at the execution environment 22-1 of the client 2-1. Then, for example, the object 15-1B (checking means) of the execution environment 12-1 interrogates the object 25-1B (notifying means) of the execution environment 22-1 for the feature structure (to be described later). The object 15-1C (downloading means) of the execution environment 12-1 and the object 25-1C (downloading means) of the execution environment 22-1 then download the objects 15-1A and 15-1B of the execution environment 12-1 as the objects 25-1A and 25-1B of the execution environment 22-1 in accordance with this response.

In the related method, it is necessary for the object to be downloaded to be provided taking into account the client API. For example, when the client is a UNIX system, the same UNIX system may be being used on the server or it may be necessary to provide an object constructed of some kind of cross-developed environment. If the server and the client have to be equipped with the same execution environment, the client device usually has to be equipped with expensive calculation resources. For example, more memory has to be provided when compared with the case where a dedicated execution environment is provided and a high speed CPU (Central Processing Unit) has to be provided to guarantee sufficient execution speed, with this increasing the cost of the device.

With regards to this, according to the system of the present invention, these problems are resolved by downloading an execution environment for the application program at the same time as downloading the application program. This is to say that by constructing just the execution environment 22 currently necessary at the client 2 at the client 2 unnecessary resources do not have to be prepared at the client 2. For example, if the client 2 does not require 3-D graphics then it is not necessary to prepare a library for this purpose.

Further, when a client is playing-back a movie image using VOD (Video On Demand), services (services which are not necessary when viewing movie images) for interacting with the user can be temporarily removed from the client with corresponding amount of calculation resources being able to be allotted to other work. These resources can then be used as a buffer for pre-fetch image data from the server 1. Services for interaction can then be downloaded from the server 1 when required.

The following have been considered as objects to be downloaded with the system of the present invention.

(1) All application programs.

(2) Device driver groups (for example, MPEG drivers, ATM drivers, image control drivers etc.) for controlling hardware resources provided by the client.

(3) Object groups (for example, VCR command management, stream management, real-time scheduler, memory management, window management, downloading control, communication protocol management, execution management etc.) providing system services for application programs.

The most appropriate execution environment for the application program can then be constructed on the client by combining these application programs and object groups.

The server 1 can be a device for transmitting image data and application programs or a device for transmitting information to the client 2 via the network 3. The client 2 is a device for processing information transmitted from the server 1 and it is not usually necessary for the client 2 to be connected to the network 3. The most appropriate execution environment can therefore be prepared for every application program because the execution environment is provided every application program.

In the related art, it is necessary to make preliminary estimate about the characteristics of the application program when constructing the system. For example, when the application program has to deal with image data, a system service equipped with a VCR-like user interface for handling real-time scheduling and image data is necessary. Further, if the application program uses 3-D graphics, a library for this purpose has to be provided and the system tends to be expanded. Typical examples are UNIX (trademark) or Windows (trademark), in which an amount of memory necessary for the system is increased each time its version is improved. With the system of the present invention, only a minimum of functions is provided for executing application programs and the problems of the systems of the related art are resolved.

By constructing an application program 11 as an assembly of a plurality of objects and by providing these objects as concurrent objects, concurrent execution is possible using each of the objects as a unit and the object can be downloaded at the same time as the application program is executed. At this time, by downloading the objects necessary in the execution of the application program incrementally as shown by the process in FIG. 5, the user can be made to feel as if the time it takes to download a single application had been much reduced.

Figure 5:
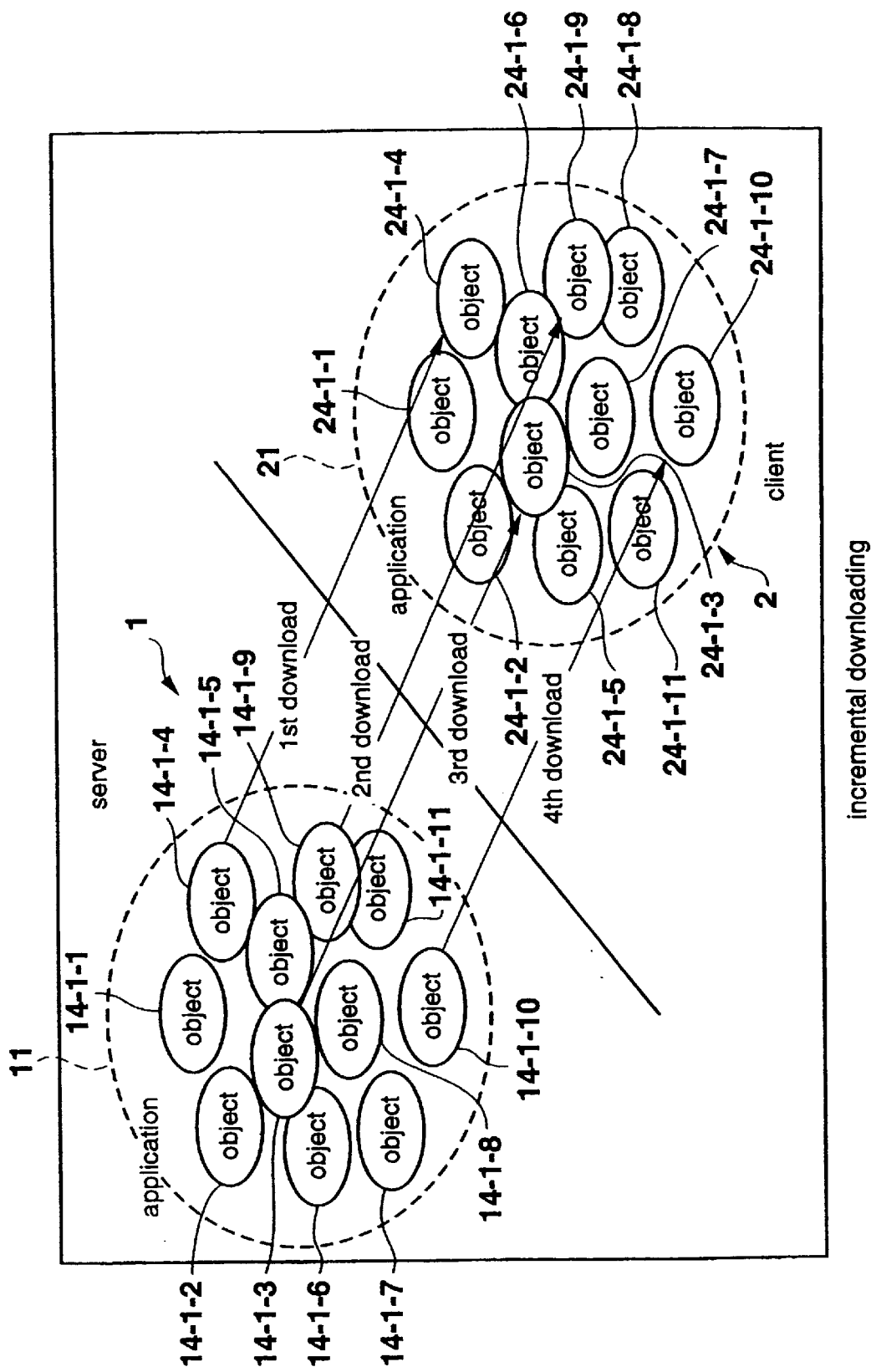
FIG. 5 is a view illustrating incremental downloading.

For example, as shown in FIG. 5, when it is necessary to download objects 14-1-1 to 14-1-11 of the application program 11 of the server 1 as the objects 24-1-1 to 24-1-11 of application program 21 of the client 2, rather than downloading each object at random, objects 14-1-1 to 14-1-3 necessary first in the execution of the application program 21 are downloaded first as the objects 24-1-1 to 24-1-3.

If these three objects exist, the application program 21 can be activated and processing starts. While this processing is being executed, the remaining objects 14-1-4 to 14-1-11 are then sequentially downloaded in second to fourth steps as the objects 24-1-4 to 24-1-11 of the application program 21. These second to fourth downloads are also executed in the order of which object is necessary first.

When the objects 24-1-1 to 24-1-3 of the application program 21 are downloaded, the processing for the application program 21 has already been started. The user then can be made to feel as if all of the objects had been downloaded. The user therefore only has to be aware of the time necessary for downloading three objects, which is shorter than the time necessary for downloading eleven objects. In other words, the user is in practical terms not aware of the time for downloading eight of the objects, so that it is as if the time had been removed.

This can be also applied to the case of constructing the execution environment 22 described with reference to FIG. 4 (and also described later with reference to FIG. 10) on the client 2. In this case, the time for downloading all of the objects for the execution environment can be made to seem less to the user by first downloading only the objects necessary for executing the application program from the objects comprising the execution environment 22. This method can also be applied to the booting of the system.

Here, incremental downloading means downloading the application program or execution environment in units of objects or portions thereof comprising the application program or execution environment as necessary rather than downloading at one time. When application programs are downloaded in conventional personal computer communications, compressed application programs are downloaded at one time. The application program can therefore not be used until downloading has completely finished. Further, with, for example, system booting, up until now, start-up would take place from when all of the system had been read into memory. In the case of a UNIX disc-less workstation, the system does not start-up until all of the OS has been read-into memory from the server so that the system can therefore not be used until reading-out is completed. This is not the case, however, if incremental downloading is used.

This method is successfully applied to a server 1 and a Set Top Box (hereinafter referred to as "STB") taken as client 2 as follows. First, it is no longer necessary to wait impatiently until the system starts up as is the case for current personal computers because the STB can soon be used after turning on the power supply. As an STB is extremely prominent as a household electrical appliance, it is not desirable to have to make the user wait until the system starts up.

When the STB is turned on, the STB downloads and starts to execute the objects necessary first. The time the user has to wait will then be just the time taken to initially download these objects. The typical time for downloading an object is a few milliseconds to a few tens of milliseconds. This time can therefore be made to be insignificant to the user by using an appropriate user interface. The necessary objects are then downloaded concurrently with the activation of the system as the activation processes for the system proceed.

Limitations also occur when executing a plurality of application programs at the same time because plenty of calculation resources such as for the server 1 are not prepared at the client 2. For example, in the case where a VOD service is selected by a navigation application program for appreciation of a movie, resources (memory) occupied by the navigation application program can be used for the movie appreciation application once appreciation of the movie has started. These resources (the object for managing the memory) can then be downloaded again at the time when the navigation application again becomes necessary.

The "time when necessary" is the time when a message is sent with regards to the object. Namely, when the very first object downloaded sends a message to another object, this object that received the message is downloaded. The object sending the next message can then be downloaded beforehand by utilizing object interdependence and reference relationships. By carrying this out concurrently with execution of the application program, delays due to downloading at the time of message communications can then be made small. This then increases the efficiency of the incremental downloading.

The execution environments 12 and 22 are also assemblies of the objects 15 and 25 and the same operations as for the objects 14 and 24 of the application programs 11 and 21 are possible. A meta-object for controlling the downloading sequence specialized for the application programs 11 and 21 can therefore be prepared as one of the objects 15 and 25 (for example, the object 25-1C of FIG. 4 is taken as an meta-object). In this way, a download sequence of an object that the above object utilizes can be appointed as being suitable for a specific application and the time a user has to wait can be minimized using incremental downloading.

A function for downloading objects from the server 1 to the client 2, an accompanying function for checking compatibility of execution environments of the objects and a function for constructing execution environments are necessary to realize this system. These are taken as the basic functions for all of the devices (clients 2) provided in this system to have. In this specification, this function is referred to as a meta-standard. The API of the execution environment of the OS etc. can be freely expanded with this meta-standard. The minimum standardization together with this expansion then will allow the API to comply with all types of applications from now on.

Figure 6:
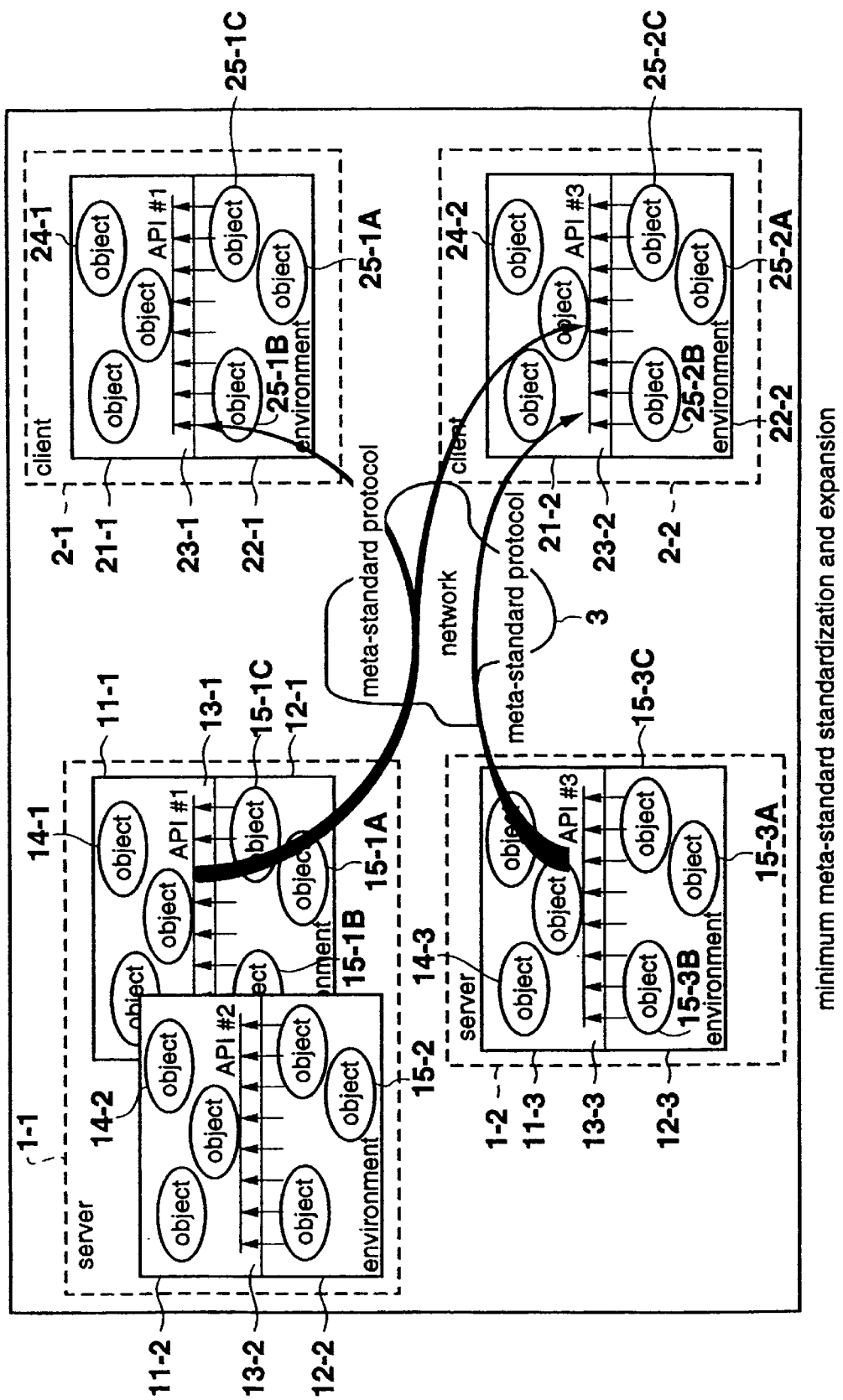
FIG. 6 is a view describing a meta-standard.

For example, with the system shown in FIG. 6, an OS having independent APIs is being operated at each of the servers 1-1 and 1-2 and each of the clients 2-1 and 2-2. Namely, an API 23-1 (API #1) for the application program 21-1 is constructed at the client 2-1 so as to correspond to the execution environment 22-1. Further, an API 23-2 (API #3) for the application program 21-2 for the execution environment 22-2 is constructed at the client 2-2.

Because of this, APIS which correspond to these APIs is already prepared at the server that downloads the programs to the clients 2-1 and 2-2. In this embodiment, an API 13-1 for the application program 11-1 is constructed at the server 1-1 for the execution environment 12-1. This API 13-1 is taken to be the API (API #1) corresponding to API 23-1 (API #1) of the client 2-1.

Similarly, API 13-3 (API #3) corresponding to the application program 11-3 is formed at the execution environment 12-3. This API 13-3 is corresponds to API 23-2 (API #3) of the client 2-2.

Objects 15-1A to 15-1C, 15-3A to 15-3C, 25-1A to 25-1C and 25-2A to 25-2C are provided as objects corresponding to this meta-standard at the servers 1-1 and 1-2 and the clients 2-1 and 2-2. As a result, necessary objects can be properly downloaded from the servers 1-1 and 1-2 to the clients 2-1 and 2-2 according to the metal-standard protocal.

To standardize the OSs of the clients into a single OS has been the tendency in this field. However, as a result of defining meta-standard as above and providing APIs corresponding to each of the client APIs only on the server side, it becomes no longer necessary to decide a standard.

As a result of not stipulating one OS standard, the object realizing the system service including the application program can be constructed independently of the OS. Namely, software written for a certain execution environment can automatically be restructured for another separate execution environment using migration. This function has not been provided in conventional systems. For example, software written for UNIX will not operate on a Windows platform without being re-written. In order to realize this function with application level software, software capable of eliminating this software dependence is necessary. However, OS independence of objects for realizing system services including device drivers become possible using this method.

Figure 7:
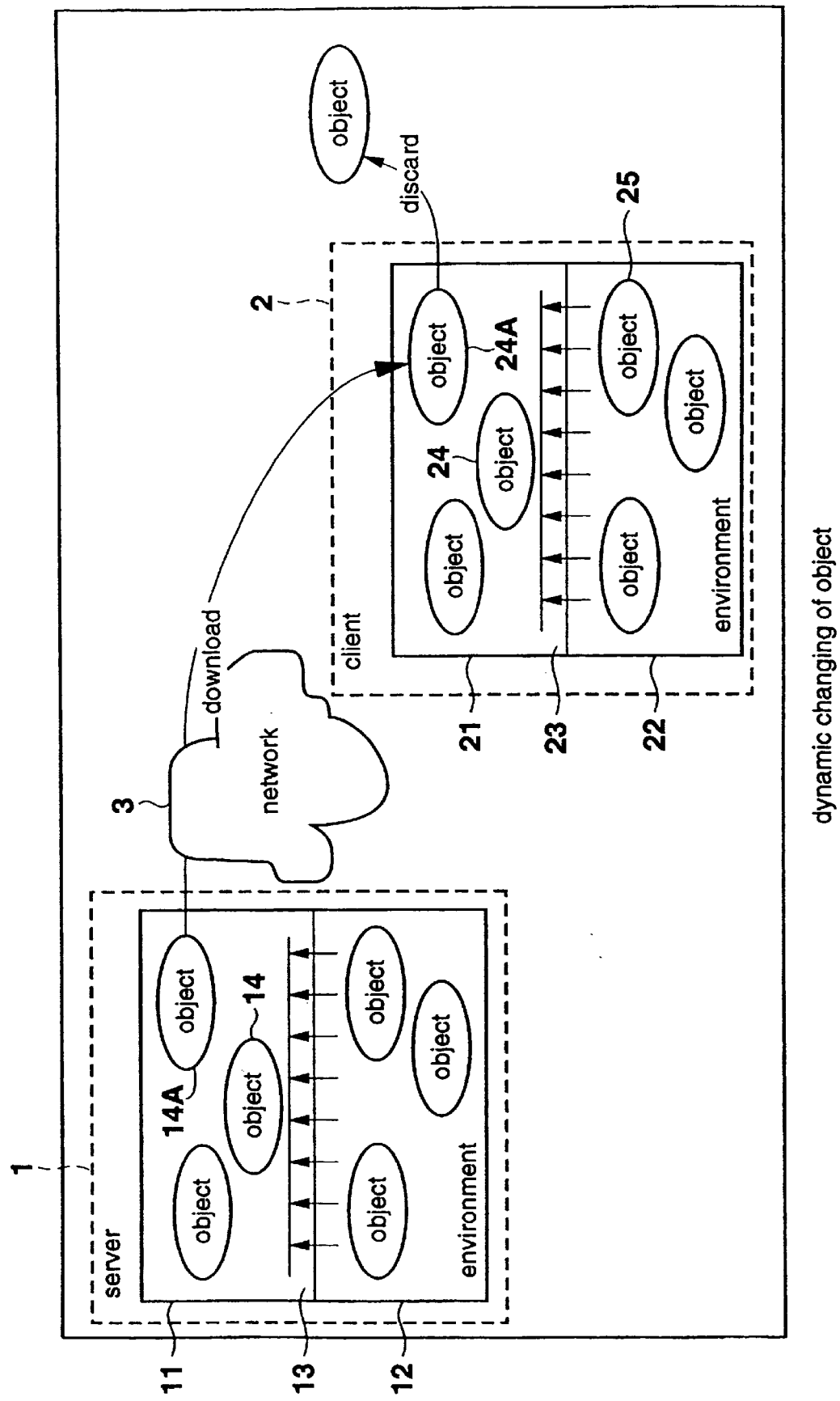
FIG. 7 is a view describing dynamic changing of an object.

By downloading objects in this way, the object of the client 2 is changed as necessary as shown in FIG. 7, i.e. an already-existing object is removed from the client and a new object is downloaded from the server.

For example, with the embodiment of FIG. 7, the object 24A of the application program 21 of the client 2 has become unnecessary and is therefore removed. A new, necessary object 14A is then downloaded to the client 2 from the server 1.

In this way, the following becomes possible.

(1) The software can be updated. For example, when a bug is found in hardware control software, this object can be removed and can be replaced with a new object. Household electrical appliances equipped with computors are used by general consumers who are not computer specialists and software updating using an installer performed in some of computers is not appropriate. Updating of software in the way of the present invention is therefore extremely effective.

(2) The product cycle can be made long. For example, models of television receivers are changed every year, but general consumers cannot buy a new television receiver every year. However, with the system of the present invention, the newest software functions can be provided to the user without having to change the television receiver and model changing of the receiver due to software function expansion is no longer necessary. This is also applied to STBs.

(3) Compliance with changes in requirements for user interfaces can be provided. For example, a user-friendly menu can be provided when the user first starts to use the device, with this then being changed to a more directly operated user interface when the user has got used to using the device. However, both procedures are not necessary to be brought over to the client side. Rather, the user interface matched the skill of the user at the time can be brought over to the client side. In this way, limited client resources can be effectively utilized.

Figure 8:
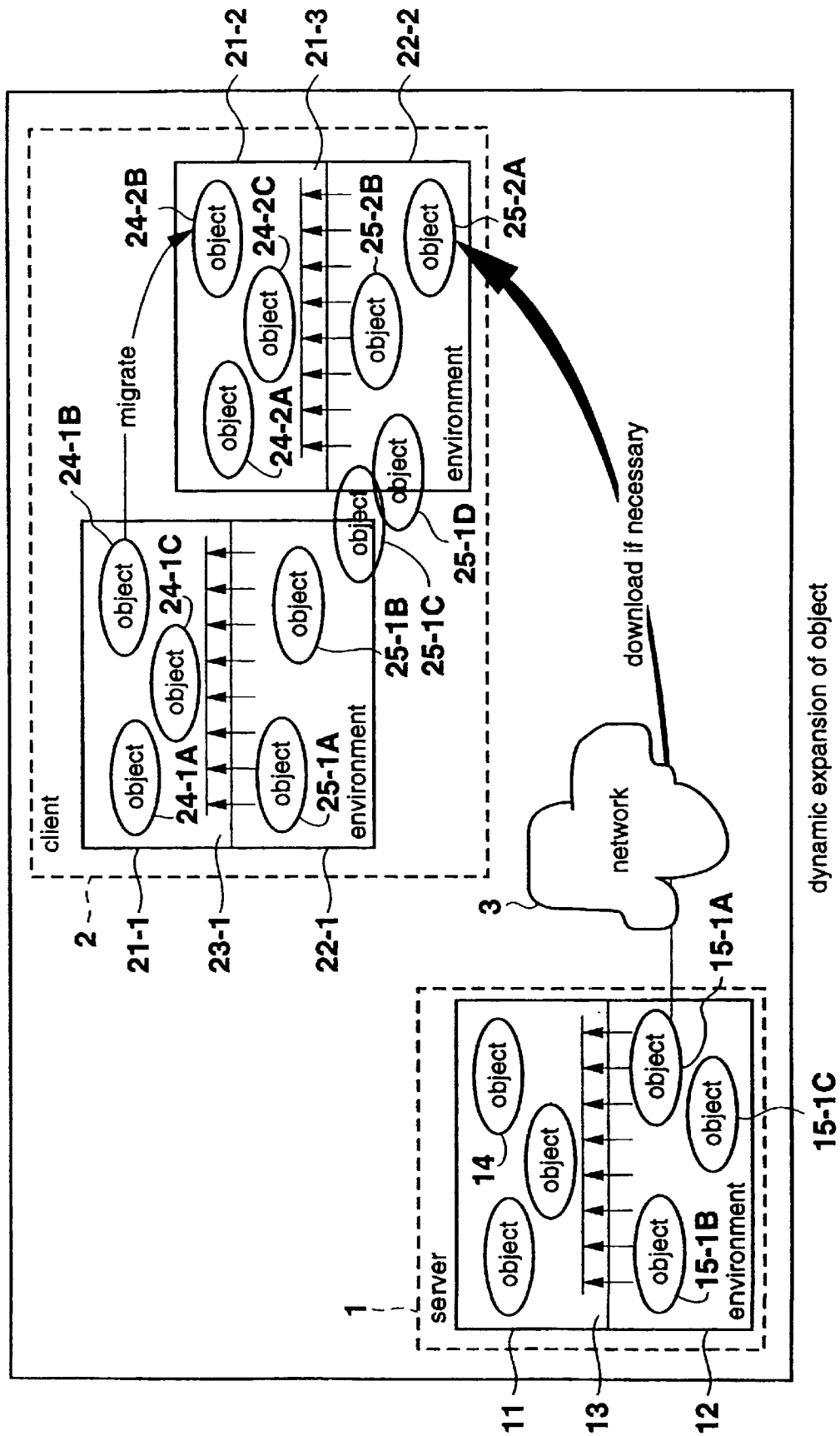
FIG. 8 is a view describing dynamic expansion of an object.

Further, a downloaded object can expand the object of the client 2 as necessary as shown in FIG. 8. In the embodiment of FIG. 8, an execution environment 22-2 for receiving a new service is generated for the object 24-1B of the application program 21-1 at the client 2. The necessary objects 25-1A and 25-1B are then migrated (shifted) from the execution environment 22-1 so as to become the objects 25-2A and 25-2B at the execution environment 22-2. Other necessary objects 25-1C and 25-1D are also migrated to the execution environment 22-2.

To the application program 21-2, the object 24-1B of the application program 21-1 is migrated to become the object 24-2B.

In this way, for example, a new execution environment for the necessary expansion of real-time scheduling is generated at the client and necessary objects are shifted over to the new environment. The object can therefore be made capable of receiving a real-time scheduling service without necessitating any changes.

The following results are obtained as a result of this.

(1) New functions can be dealt with without having to add any changes to application program objects. The application program life therefore becomes longer and reusability is improved. In the related method, changing of the execution environment meant the re-writing of the application program because dependent code for the execution environment was included in the application program.

(2) With regards to application programs included in the equipment, highly functional control software for the equipment including the user interfaces is the part wished to be re-used unless the model of the equipment is not largely changed or to have shortened development periods only by expanding software functions using already existing code. However, if the part includes code dependent on the execution environment, the work involved in re-utilization becomes complicated. With methods up until now, no countermeasures were taken for utilization of the part, but with the method of the present invention this work is made to be either automatic or minimal.

The system of the present invention can be applied specifically in the following way.

(1) Halting of the whole system can be prevented by downloading a memory protection function when the reliability of the application program is low.

(2) Services provided by service provider can be changed every STB vendor. For example, a service provider providing a movie of movie company A can change the characteristics of the image to be transmitted according to whether the image is received by the STB of company B or the STD of company C.

(3) The processing method of the system can be changed in accordance with the compression method of audio-visual data sent to an STB or the picture quality requested by the user. For example, the method taken when adjusting picture quality is different for MPEG data and JPEG data and it has therefore been necessary to change the processing method of the system. However, with the system of the present invention, the processing method is selected as necessary in accordance with the data format.

Figure 9:
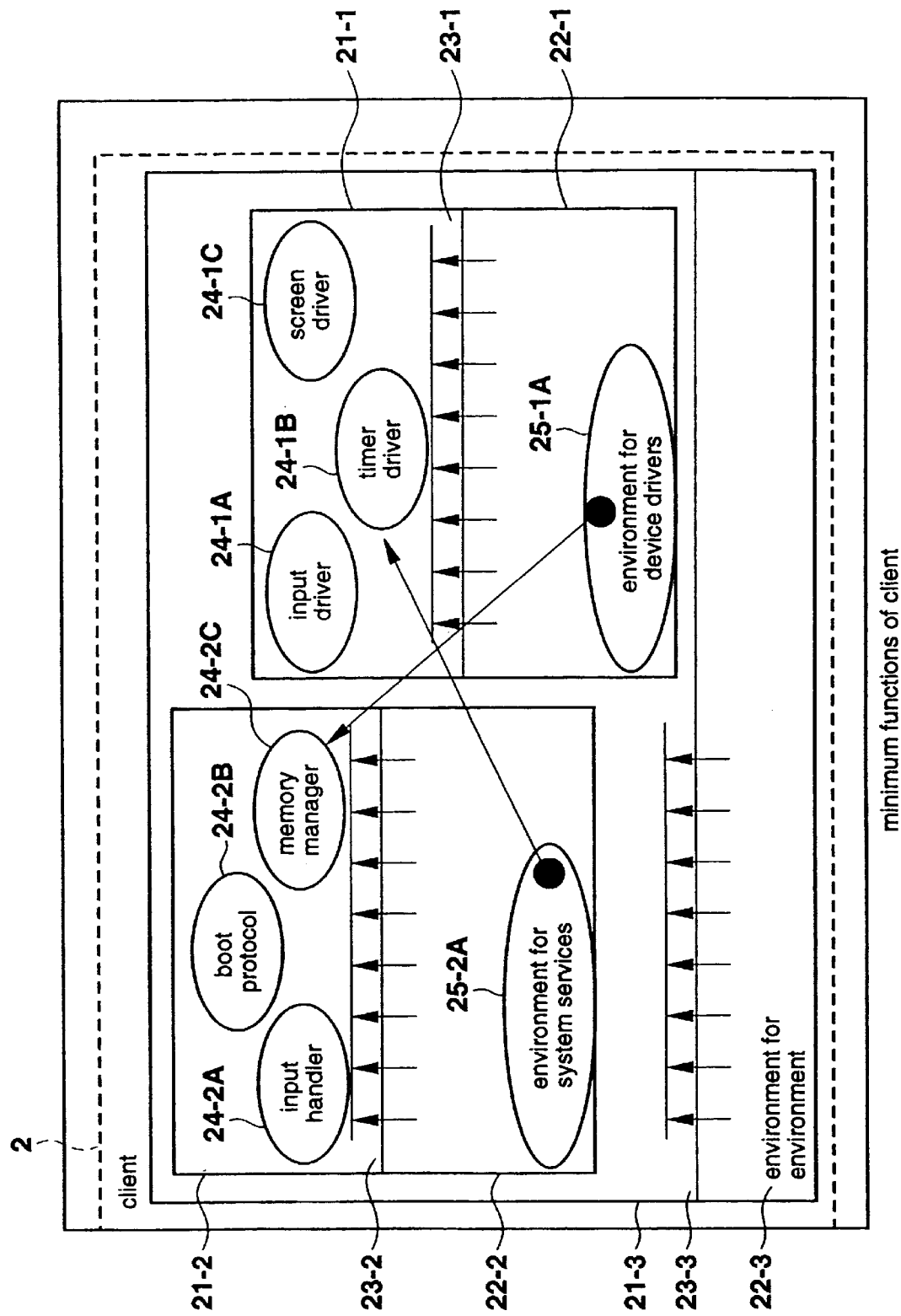
FIG. 9 is a view describing the minimum functions of client.

It is therefore not necessary for the client 2 to provides various functions beforehand because most of the functions for the system can be downloaded from the server 1 and the client 2 is therefore made to only provide a minimum of functions needed. FIG. 9 shows the minimum of functions possessed by the client 2 of the system of the present invention. An execution environment 22-1 for the device driver, an execution environment 22-2 for the system object and an execution environment 22-3 for the execution environment are formed at the client 2 as minimum functions.

The device drivers necessary for being existed beforehand are an object 24-1A taken as an input driver for processing input, an object 24-1B taken as a timer driver for managing time and an object 24-1C taken as a screen driver for controlling displaying. The system objects are an object 24-2A taken as an input handler for managing input, an object 24-2B taken as boot protocol for managing activation, and an object 24-2C taken as a memory manager for managing memory. A more highly functional device drivers or system objects can be downloaded from the server 1.

Figure 10:
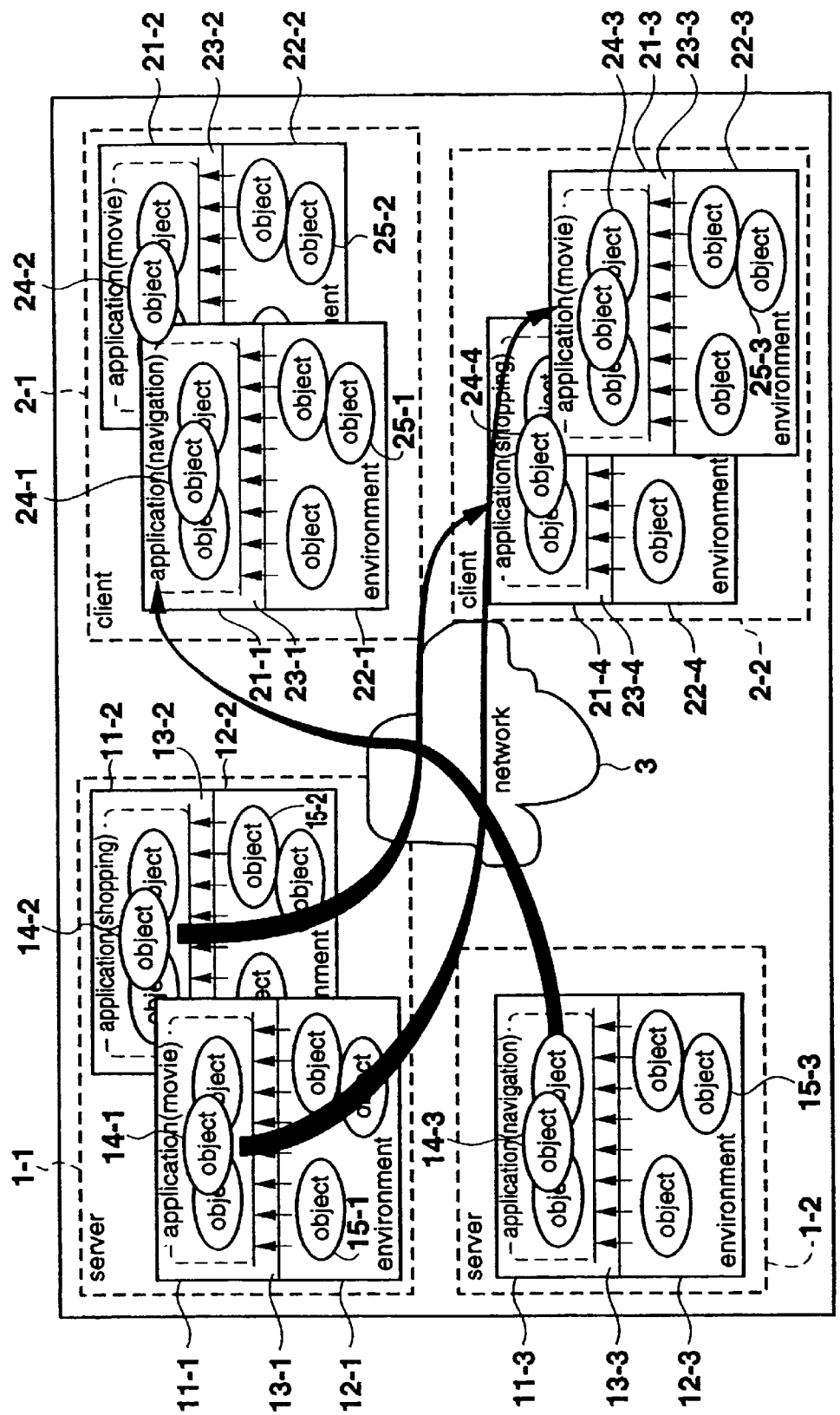
FIG. 10 is a view describing the client environment structure suitable for an application and dynamic restructuring thereof.

FIG. 10 shows an embodiment of a dynamic structure of client environments suitable for application programs (video, game, shopping, etc.) sent out from the server. In FIG. 10, an execution environment 22-4 for shopping use is constructed on the client 2-2 so that a shopping application program 11-2 can be downloaded from the server 1. Further, when the client 2-2 changes the application program over from the shopping application program to a movie application program, an execution environment 22-3 for a movie application program 21-3 is constructed on the client 2-2 and the movie application program 11-1 is downloaded from the server 1.

For example, the following process can be considered.

(1) When a user selects a movie.

At this time, a navigation application 11-3 is downloaded from the server 1-2 to, for example, the execution environment 22-1 of the client 2-1 so that the desired movie can be selected and an object 15-3 for window management and for managing inputs from the user etc. is downloaded as an object 25-1 as the necessary environment for the navigation application 11-3.

(2) When a user is enjoying a movie.

At this time, an object 15-1 for video stream management, data pre-read buffer management and VCR functions etc. is downloaded from the execution environment 12-1 of the server 1-1 to, for example, the execution environment 22-3 of the client 2-2 as an object 25-3.

Figure 11:
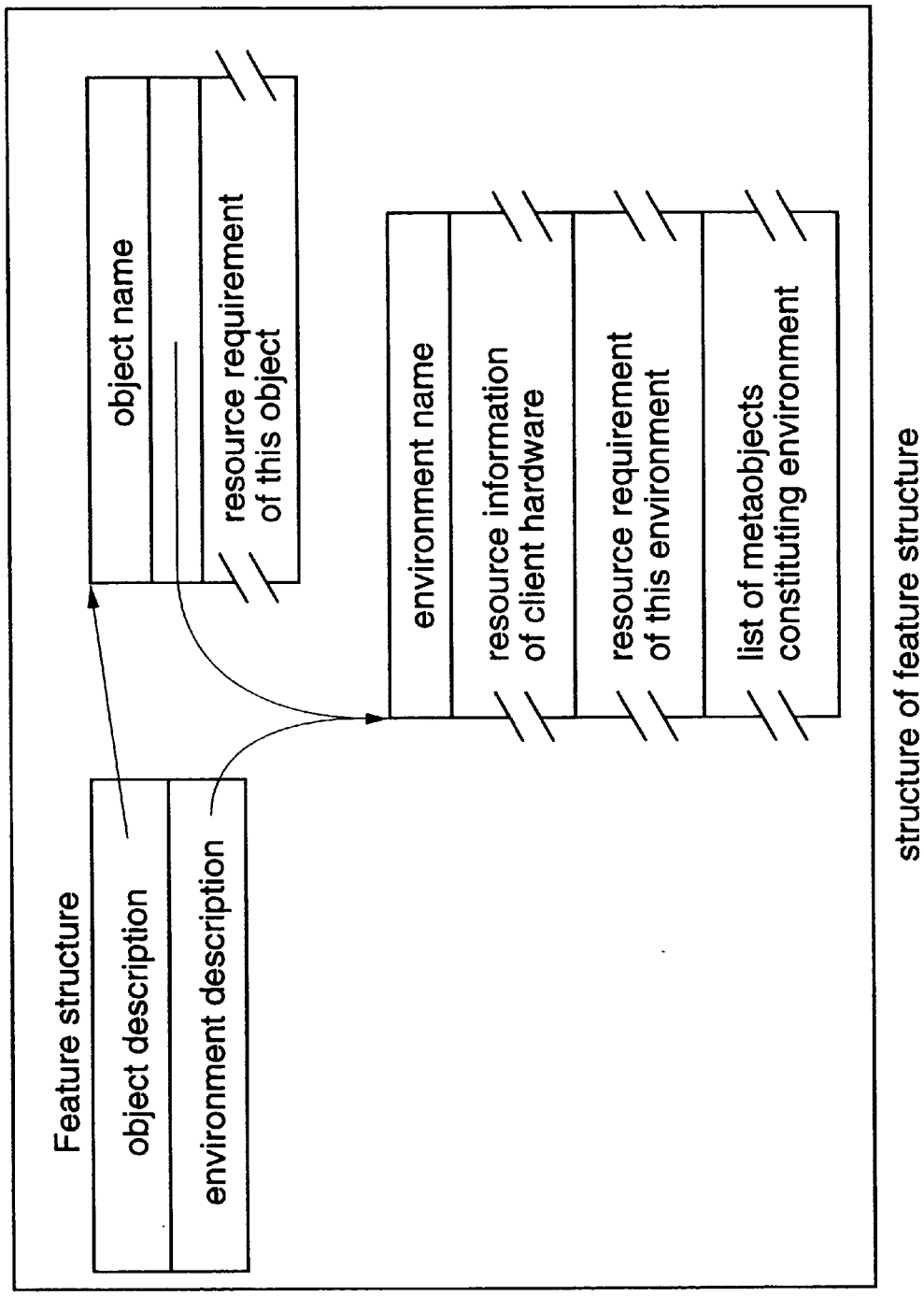
FIG. 11 is a view describing a structure of a feature structure.

In the system of the present invention, the feature structure shown in FIG. 11 is introduced in order to present the execution environment of the client by downloading. This feature structure is checked when objects are downloaded from the server 1 to the client 2 and the necessary execution environments are constructed where the objects are downloaded.

First, the server 1 carries out a negotiation with the client 2 in a first phase (negotiation phase) for the possibility of an object migration between meta-object space of the server 1 and meta-object space of the client 2. In a second phase (transferring phase) the object is then actually transferred.

Object migration is a meta-level process which transmits the calculation resources in-use using internal information of the object and objects related to this object if necessary. The internal information of the object is expressed by a meta-level object referred to as a descriptor. In reality, the descriptor holds the name of the meta-object managing the object. A typical descriptor holds the name of the meta-object managing memory segments for the object, the name of the meta-object performing execution control of two or more objects (scheduler) and the name of the meta-object managing the giving of names to objects, etc.

A check is made in the first phase (negotiation phase) for the possibility of shifting object. In some meta-object spaces, object migration is not desirable. For example, if an object (device driver) is shifted in a meta-object space for managing a device driver, this shifting becomes actually meaningless if a hardware device does not actually exist at the client 2. Further, a meta-object managing memory segments of the object using a virtual memory management structure cannot manage the memory segments even by carrying out shifting if a virtual memory management structure does not exist where the objects are shifted. The following method is therefore prepared for the migration protocol.

Feature* Descriptor:: CanSpeak (Feature* pFeature).

In this method, a CanSpeak operation is executed for the descriptor within the meta-object space at the client 2.

At this time, a feature structure is passed from the server 1 as an argument. As a result, the client 2 returns a feature structure to the server 1 indicating that acceptance at the client 2 is possible. The server 1 then checks the feature structure returned from the client 2 so as to be able to know in which categories given below the compatibility of this meta-object space is included.

Compatibility can be classified into three categories, completely compatible, partially compatible and incompatible.

Complete compatibility means that the object can be completely executed even after being shifted. Partial compatibility means that some restrictions are put on execution of the object after being shifted. Incompatibility means that the object cannot be continued to be executed after being shifted.

Object migration is not carried out in the case of incompatibility. In the case of partial compatibility, whether or not migration is carried out is decided by the user. In reality, an exception is sent back to the user and a migration decision is made using the exception process routine. In the case of complete compatibility or partial compatibility when object migration can be carried out, migration is carried out in accordance with the contents of the feature structure returned previously.

Before the negotiation phase, an empty descriptor is generated at the meta-object space of the client 2 by the next operation.

Descriptor::Descriptor( )

The previous CanSpeak method can be forwarded for this descriptor. At this time, necessary meta-object generation, reference generation and listing of necessary information are carried out on the basis of the feature structure information.

The process at the meta-level of the second phase is the shifting or transmitting of the meta-object corresponding to the transmitted descriptor. Here, shifting of the meta-object is the entering of this meta-object to the meta-object space of the client 2, i.e. being referenced from the descriptor. Further, transmitting of the meta-object means transmitting the data within the meta-object as a message for the meta-object (which is referenced from the descriptor) present at the meta-object space at the client 2.

The actual operation relating to the shifting and transmitting of the meta-object is executed in this second phase (shifting phase) utilizing the feature structure obtained by the negotiation phase.

The actual transferring and transmitting of the meta-object in the shifting phase is activated by the following method.

Descriptor & Descriptor::operator = (Descriptor & source)

The descriptor class is an abstract class which defines a common protocol relating to the shifting and transmitting of the meta-object. The contents of the descriptor referenced using the source are copied to this descriptor.

The actual procedure can be defined as a subclass of the descriptor class.

The next method is a method relating to transmitting of the meta-object. These protocols are mainly used by a migrator (a meta-object included within the meta-object space for carrying out object migration).

CanonicalContext& Context::asCanonical( )

Converting a machine-dependent Context structure to a machine-independent form. This protocol is executed when the feature structure indicates that a direct conversion of Context is not possible.

Context& Context: operator
=(Context& source)
Context& Context::operator
=(CanonicalContext& source)

The Context currently referenced by this is initialized using the Context referenced by source.

CanonicalSegment & Segment::asCanonical( )

Converting a machine-dependent Segment structure to a non-machine-independent form. This protocol is executed when the feature structure indicates that a direct conversion of Context is not possible.

Segment& Segment::operator
=(Segment& source)
Segment& Segment::operator
=(CanonicalSegment& source)

The Segment currently referenced by this is initialized using the Context referenced by source and the necessary region of memory is copied.

FIG. 11 shows the configuration of the feature structure. As shown in FIG. 11, pointers of the object description and the environment description are described in the entry.

An object name, a pointer of the same structure as for the structure indicated by the pointer of the environment description and the resource requirement of this object are described at the structure indicated by the pointer of the object description.

Further, an environment name, resource information of client hardware, resource requirement of this environment and list of meta-objects constituting the execution environment are described at the structure indicated by the pointer of the environment description.

A specific example of the contents of a feature structure is as follows.

(1) Information relating to the object.
real time processibility
amount of required processor
(2) information relating to meta-object
hardware meta-object
  processor type
  data format
segment meta-object
  size
  expandability, compressibility
  management principle
  layout
context meta-object
  register information
  number of temporary variables
processor conditions
mailer meta-objects
  message cue length
  number of available processor messages
  necessity of external mailer
  message transmission method
external mailer meta-object
  message cue length
  number of available processor messages
  protocol
scheduler meta-object
  object conditions
  scheduling principle
management-dependent meta-object
  number of external names possessed As described above, when each of the clients have different OSs, the OSs of each of the clients are determined from this feature structure and the server then downloads objects corresponding to these OSs.

Figure 12:
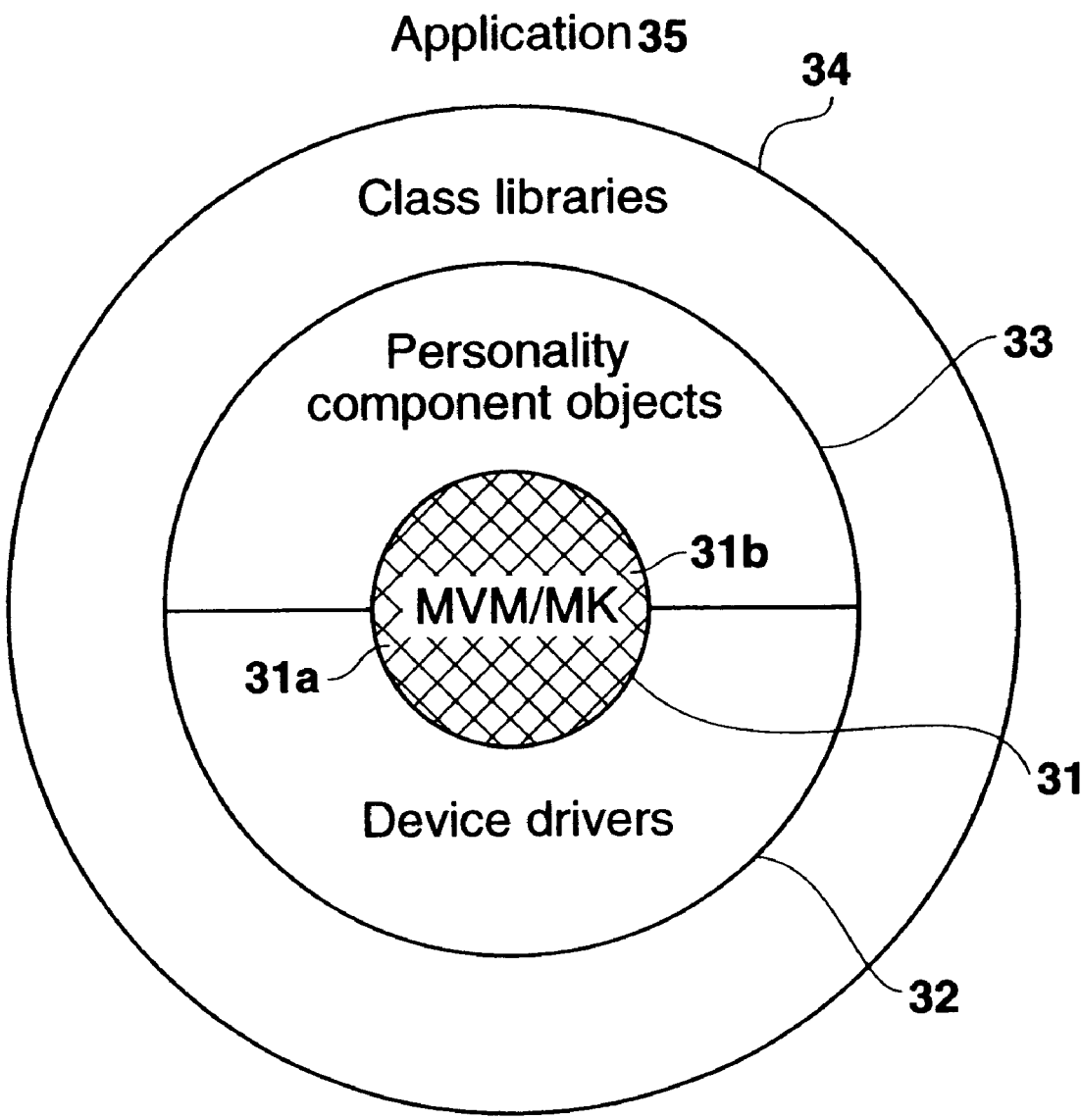
FIG. 12 is a view showing an example system structure to which the data processing device of the present invention is applied.

FIG. 12 shows an example of a system structure to which the data processing system of the present invention is applied. A core 31 of this system comprises a Micro Virtual Machine (MVM) 31a (first execution means) and a Micro Kernel (MK) 31b (second execution means). The MVM 31a interprets and executes intermediate code (I-code) to be described later and can called-up a personality object (system object) using the functions of the MK31b as necessary.

Portions other than the core 31 shown in FIG. 12 can, for example, be downloaded from the server 1 using the aforementioned methods.

This system dynamically compiles I-code into native code (binary code, machine code) as necessary. Objects already compiled in native code can be executed but in this case, the personality object 33 (binary code generating means) is called-up using the functions of the MK 31b and provides a service to the applications 35.

The MVM 31a and the MK 31b comprising the core 31 shown in FIG. 12 are surrounded by device driver objects (Device drivers) 32 and Personality objects (Personality component objects) 33, which are in turn surrounded by a class system (Class Libraries) 34 prepared for carrying out application programming, which are in turn surrounded by application programs 35.

The layer of personality objects 33 allows this system to provide various OSs or virtual machines. For example, execution of BASIC programs is carried out by executing intermediate code obtained by compiling the BASIC program using personality objects for BASIC programming.

In the system of the present invention, programs are compiled to I-code (intermediate code) for managing the object method so as to obtain a high degree of portability. Although I-code is not designed on the presumption of being interpreted and executed (executing the program while interpreting the program), but is designed to be compiled as necessary into native code. However, the MVM interprets and executes the I-code when dynamic compiling of the I-code is difficult due to various limitations.

However, in most cases the I-code is compiled into native code and directly executed by a CPU constructed within the system. Deficiencies in real time processibility or loss of processing speed accompanying Virtual Machine execution is therefore negligible.

The I-code comprises two instruction sets (OP_M, OP_R) of sufficiently high abstractness, to be described later with reference to FIG. 22 so as to give a high degree of Inter-Operability. The semantics (the structure of meanings) of these instruction sets is strongly related to the interface of MK31b. This is to say that the instruction sets are under the strong influence of the structure of the system of the present invention shown in FIG. 12. The system of the present invention therefore has a high degree of Portability and Inter-Operability in spite of assumption of the native code.

Next, the method for the MVM 31a and the MK 31b is described. First, the data structure assumed by the MVM 31a and the I-code format are stipulated.

Figure 13:
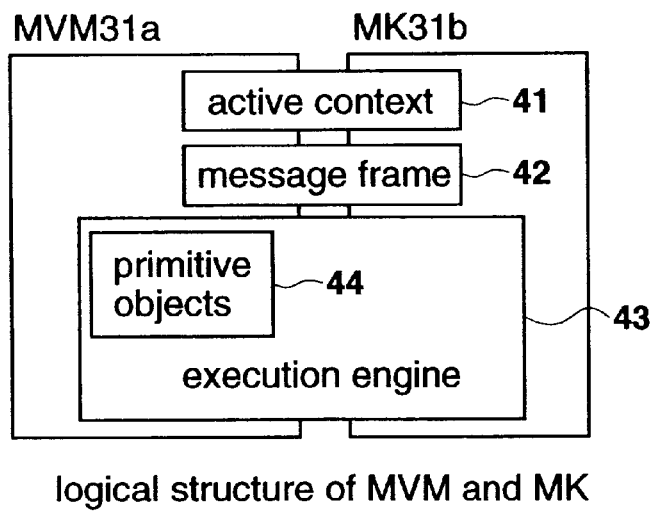
FIG. 13 is a view showing the logical structure of an MVM and an MK.

FIG. 13 shows the logical structure of the MVM 31a and the MK 31b shown in FIG. 12. The logical structure of both the MVM 31a and the MK 31b is basically the same, with both comprising an active context 41, a message frame 42 and an execution engine 43. However, the MVM 31a supports execution using I-code and the MK 31b supports execution using native code.

In FIG. 13, active context 41 points to the Context (described later with reference to FIG. 14) currently being executed and the message frame 42 points to the main part of the message for the MVM 31a and the MK 31b comprising the core 31.

In the case of MK 31b, the place where the main part of the message exists depends on the implementation system with there being cases where this place is allotted to memory as a stack frame, allotted to a heap or allotted to registers of a number of CPUs. On the other hand, in the case of MVM 31a, the message frame points to an operand following the instruction code. Internal registers other than these registers may also be necessary depending on the implementation but these registers are independent of this method.

In FIG. 13, the execution engine 43 executes I-code and native code. Further, primitive objects 44 are included at the execution engine 43 of the MVM 31, with these primitive objects 44 being code for processing primitive objects to be described later with reference to FIG. 18.

Figure 14:
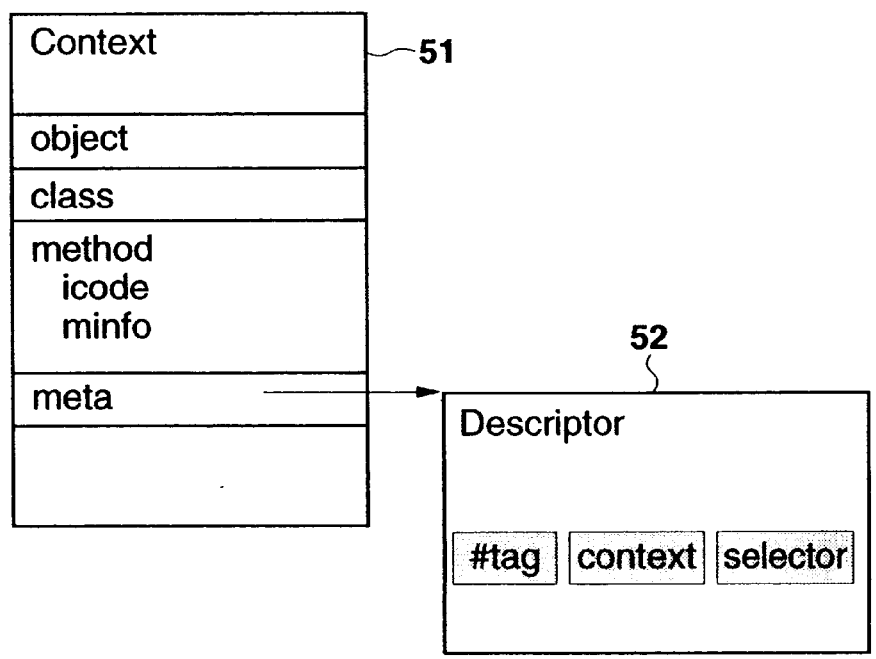
FIG. 14 is a view showing the logical structure of Context and Descriptor.

FIG. 14 shows the logical structure of the Context and Descriptor. The context structure 51 showing one execution state of the program comprises the fields of object, class, method and meta-etc., with further fields of icode and minf being provided at the field method. This Context structure 51 holds the state of MVM 31*a*, corresponds to a CPU register, and is completely independent of the memory management and systems of communicating between programs etc.

The Context structure 51 is a Context primitive object, with each field being linked with prescribed information, as described later with reference to FIG. 16. Further, the Context structure 51 is deeply dependent on the implementation of the core 31 (MVM 31*a* and MK 31*b*) but only portions which are not dependent are shown in FIG. 14.

The important field at the Context structure 51 is the meta-field, with this field pointing to the Descriptor structure 52. The entries for the Descriptor structure 52 consist of three groups, #tag, context and select, with the API of the Personality object 33 being decided by this descriptor structure 52. Here, #tag expresses the API name and addresses of the API are expressed by context and selector.

Figure 15:
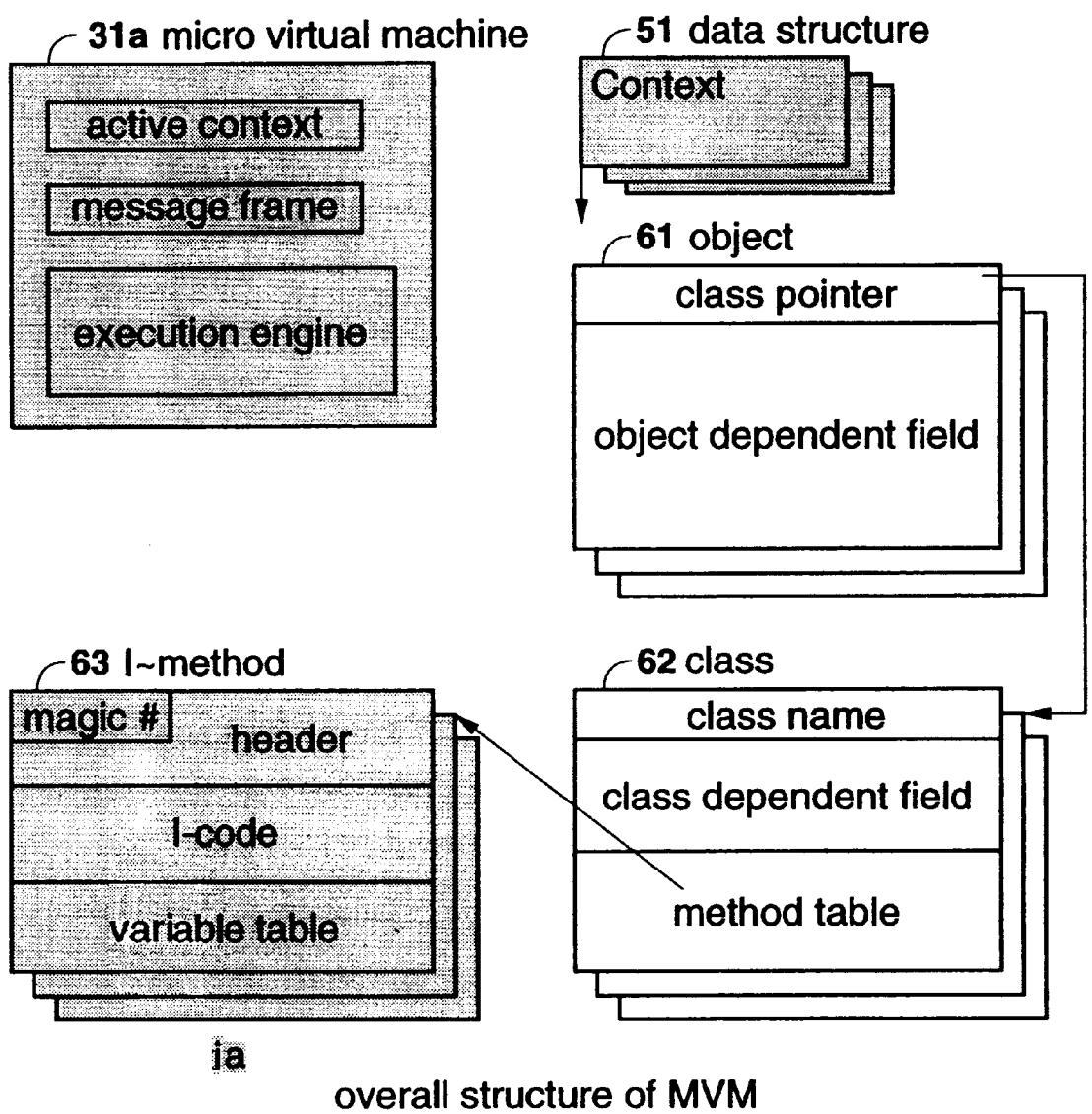
FIG. 15 is a view showing the overall structure of an MVM.

FIG. 15 shows the whole structure of the MVM 31*a*. Basically, all of the necessary information can be referenced by following links from the Context structure 51. Namely, the Context structure 51 is linked to the object 61. This object 61 comprises a link (class pointer) to a class corresponding to the object 61 and an instance region (object dependent field). What kind of information is stored at the instance region or in what manner this information is laid-out depends on the implementation of the object.

The class 62 mainly holds the method. The class 62 comprises the name (class name), the portion depending on the conditions of implementation (class dependent field) and the link table (method table) to the I-method structure 63. The I-method structure 63 is the block primitive object and comprises a header (Header), an I-code and a variable table (variable table). Further, magic# is the management number (ID) of the MVM 31*a*. Basically, the I-code instruction operand refers to the target object via this variable table entry.

In FIG. 15, the gray portions (Context 51, I-method 63) are portions depending on the MVM 31*a* and are structures required when the MVM 31*a* translates and executes the I-code.

Figure 16:
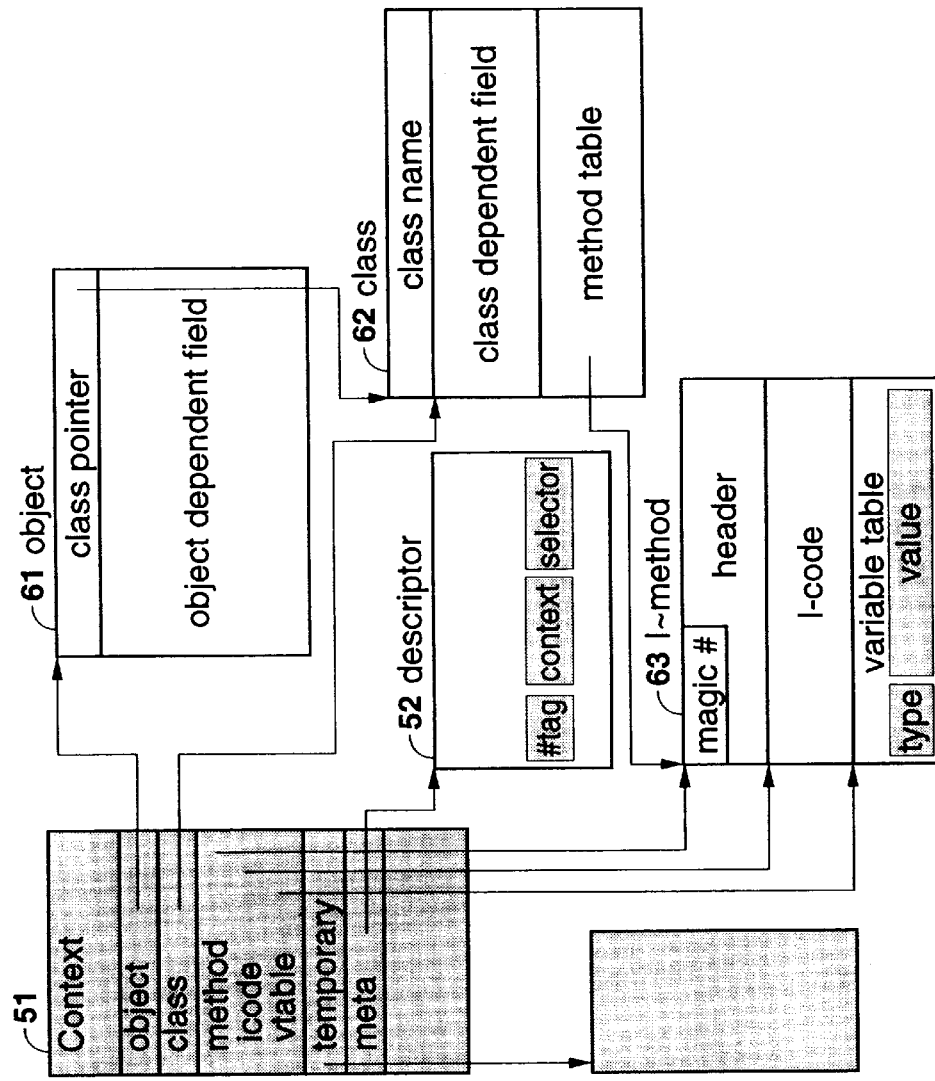
FIG. 16 is a view showing the data structure of Context and items surrounding Context.

FIG. 16 shows structures linking-out from the Context structure 51. The object field of the Context structure 51 points to the object 61 and the class field points to the class-dependent field of class 62, with the icode of this method field pointing to the I-code of the I-method 63. The icode corresponds to the program counter and points to the program being executed. Further, vtable of the method field points to the variable table of the I-method 63.

The temporary field points to a region for temporarily saving data and the meta-field points to the descriptor 52 described above. Moreover, the class pointer of the object 61 points to class 62 and the method table of the class 62 points to I-method 63.

The variable table entry is a group consisting of type and value, with the value depending on the type.

The MVM 31*a* processes the type as shown in FIG. 17. When the type is T_PRIMITIVE, the value field refers to a primitive object. The kind of group of <P_CLASS, P_BODY>shown in FIG. 18, such as, for example, <P_INTEGER, immediate>, <P_STRING, address to heap>is stored at the value field. FIG. 18 shows the primitive object list together with the name of interface (listed in the column of P_CLASS). FIG. 19 to FIG. 21 show an example of the primitive object interface shown in FIG. 18 described using an Interface Definition Language (IDL) method. This IDL method is disclosed in "COBRA V2.0, July 1995, P3-1 to 3-36".

In FIG. 17, an ID for referring to the object is stored in the value field when the type is T_POINTER. This ID is the only value within the system with its position being independent. An object position corresponding to the ID is then specified by a personality object 33.

FIG. 22 shows two instruction sets interpreted and executed by the MVM 31. In the structure of FIG. 12, the instruction set OP_M is instructions entering from outside to inside and the instruction set OP_R is instructions returning from inside to outside.

Namely, the instruction set OP_M executes the operation indicated by this first operand. This operation is processed by Personality object 33 or by a primitive object. Further, the compiler generates I-code in order to execute the applications 35 in a more efficient manner as a number of processes are processed by the primitive object. In this way, for example, the arithmetic operation for integer is processed by the leading primitive object of FIG. 18.

Next, the interface of MK 31*b* is specified. FIG. 23 shows the interface of the micro kernel (MK) 31*b*. The logical structures of the MVM 31*a* and the MK 31*b* are the same as that shown in FIG. 13. Here, MK 31*b* processes the instruction sets OP_M and OP_R shown in FIG. 22 as a system call.

The system constructed in the way described above can be applied to, for example, the client 2 (2-1, 2-2) shown in FIG. 4. The execution environment most suitable for executing a prescribed application can then be constructed on the client 2 by downloading an arbitrary portion of the portions other than the core 31 shown in FIG. 12 from the server 1.

As described above, the following can be considered as objects to be downloaded.

(1) All application programs.

(2) Device driver groups (for example, MPEG drivers, ATM drivers, image control drivers etc.) for controlling hardware resources provided by the client.

(3) Object groups (personality objects) providing system services for application programs (for example, VCR command management, stream management, real-time scheduler, memory management, window management, downloading control, communication protocol management, execution management etc.) providing system services for application programs.

The most appropriate execution environment for the application program can then be constructed on the client by combining these application programs and object groups.

For example, when it is wished to execute a BASIC program, the personality object 33 for BASIC and the BASIC program (application) 35 are downloaded from the server 1. This system is capable of providing a BASIC Virtual Machine using this personality object 33. The downloaded BASIC program is then temporarily compiled into intermediate code by the compiler and executed by the BASIC Virtual Machine. The BASIC program can alternatively be executed after having been compiled into native code in the way described above.

In the aforementioned embodiment, downloading of a prescribed object was carried out from the server to the client. However, the present invention can also be applied to downloading of objects from a prescribed client to a prescribed server or to downloading of objects between servers or between clients.

Further, in the aforementioned embodiment, the I-code comprises two instructions, but the present invention is by no means limited in this respect.

According to the data processing method and data processing device of the present invention, a check is made as to whether or not the client has the execution environment of the application program to be downloaded and the application program is then downloaded to the client on the basis of this check. The structure of the client can therefore be simplified and the cost can be reduced. This makes the providing of cheap application programs possible.

Moreover, with the data processing device of the present invention, notification is given to the server with regards to the execution environment for the application program to be downloaded, with the application program then being downloaded from the server on the basis of this notification. This makes low-cost devices with simplified structure to be feasible and also makes the providing of low-cost application programs possible.

With the data processing device and data processing method of the present invention, an application program converted into intermediate code is interpreted and executed, or intermediate code is dynamically compiled and the generated binary code is executed. Intermediate code can therefore be gradually interpreted and executed when dynamic compiling is difficult. Still further, portable applications can be constructed by giving the intermediate code a simple structure.

What is claimed is:

1. A data processing method for a data processing system comprising the steps of:

checking by a server whether a client has an execution environment required for supporting execution of a requested object;

transferring said requested object from said server to said client when it is determined that said required execution environment exists at said client;

transferring one or more execution environment objects from said server to said client when it is determined that said required execution environment does not exist at said client so that said required execution environment is transferred to said client, each of said execution environment objects being adapted to support more than one object that may be requested by a user; and transferring said requested object.

2. The data processing method of claim 1, wherein said execution environment is formed of at least one execution environment object, and all of the objects are concurrent objects, each executing a single thread of control.

3. The data processing method of claim 1, wherein all of the objects are concurrent objects, each executing a single thread of control.

4. The data processing method of claim 1, wherein execution environment objects are transferred incrementally from said server to said client in accordance with the needs of said requested object.

5. The data processing method of claim 4, wherein transferred execution environment objects are executed concurrently with the transfer of additional objects.

6. The data processing method of claim 5, wherein a transferred requested object is executed upon the transfer of said required execution environment objects, and further objects are transferred thereafter.

7. The data processing method of claim 6, wherein objects that are required first for processing are transferred first.

8. The data processing method of claim 7, wherein an object controls the sequence and timing of the transfer of objects.

9. The data processing method of claim 1, further comprising the step of transferring to said client an updated execution environment object to replace an existing execution environment object if it is determined that said existing execution environment object includes a performance problem.

10. The data processing method of claim 1, further comprising the step of generating an application program to be executed at said client by utilizing a combination of at least an existing object and a newly transferred object.

11. The data processing method of claim 1, further comprising the step of removing an execution environment object from said client when the execution environment object is no longer required to support a next requested object.

12. The data processing method of claim 1, further comprising the step of removing said transferred desired object when a new desired object is to be transferred to said client.

13. The data processing method of claim 1, further comprising the step of constructing an execution environment as a combination of said transferred execution environment objects.

14. The data processing method of claim 13, further comprising the step of determining that all required execution environment objects are present to construct said execution environment to support said desired object.

15. The data processing method of claim 14, further comprising the step of constructing a second execution environment in response to the needs of a new desired object, said new execution environment employing at least one execution environment object from said execution environment objects comprising said execution environment.

16. The data processing method of claim 1, wherein said execution environment comprises at least:

a transfer function for transferring an object from said server to said client; and a checking function for checking whether said client has an execution environment required for supporting execution of said requested object.

17. The data processing method of claim 1, wherein said client comprises a plurality of execution environments, comprising at least:

a device driver execution environment including objects for implementing device drivers;

a system execution environment including objects for implementing system functions; and a core execution environment supporting objects included in the remainder of said plurality of said execution environments.

18. The data processing method of claim 1, wherein said server passes to said client a feature structure including a description of said requested object and said required execution environment, for checking by said server.

19. A data processing device for transferring a plurality of objects to a client comprising:

first memory means for maintaining a plurality of first objects;

second memory means for maintaining a plurality of second objects which provide a plurality of application program interfaces for each of said first objects;

checking means for checking whether said client includes second objects sufficient to provide required application program interfaces to support a desired first object to be transferred to said client;

first object transfer means for transferring said desired first object to said client when it is determined that said required second objects exist in said second memory means; and second object transfer means for transferring one or more second objects to said client when it is determined that said required second objects are not included in said second memory means, so that said required second objects are included at said client, each of said execution environment objects being adapted to support more than one object that may be requested.

20. The data processing device of claim 19, wherein all of said first and second objects are concurrent objects, each executing a single thread of control.

21. The data processing device of claim 19, wherein all of said first and second objects are concurrent objects, each executing a single thread of control.

22. The data processing device of claim 19, wherein said second objects are transferred incrementally to said client in accordance with the needs of said desired first object.

23. The data processing device of claim 22, wherein transferred second objects are executed concurrently with the transfer of additional objects.

24. The data processing device of claim 23, wherein a first transferred first object is executed upon the transferring of said required second objects, and further first and second objects are transferred thereafter.

25. The data processing device of claim 24, wherein objects that are required first for processing are transferred first.

26. The data processing device of claim 25, further comprising an object for controlling the sequence and timing of the transfer of said first and second objects.

27. The data processing device of claim 19, wherein said second object transfer means transfers an updated second object to replace an existing second object if it is determined that said existing second object includes a performance problem.

28. The data processing device of claim 19, wherein an applications program to be executed is generated at said client by utilizing a combination of at least an existing first object and a newly transferred first object.

29. The data processing device of claim 19, wherein a particular second object is removed from said client when a next desired first object does not require said particular second object for support.

30. The data processing device of claim 19, wherein a desired, transferred first object that is no longer required by said client is removed from said client when a new desired first object is to be transferred to said client.

31. The data processing device of claim 19, further comprising means for constructing an execution environment at said client as a combination of said transferred second objects.

32. The data processing device of claim 31, wherein a second execution environment is constructed by said means for constructing to support a second desired object, employing at least one second object from said second objects forming said execution environment and supporting said desired object.

33. The data processing device of claim 19, wherein said second objects include at least:
   a transfer object for transferring an object to said client; and
   a checking object for checking whether said client includes second objects sufficient to support said desired first object.

34. The data processing device of claim 19, wherein said client comprises a plurality of second objects, including at least:
   a device driver second object for implementing device drivers; and
   a system second object for implementing system functions;

said client further comprising a core execution environment supporting at least said device driver and said system second objects.

35. The data processing device of claim 19, wherein a feature structure is transferred to said client, said feature structure including a description of said desired first object and said second objects sufficient to support said desired first object.

36. A data processing system comprising:
   a server; and
   a client having at least one execution environment, said client being adapted to allow for the request of an object to be transferred from said server, and being adapted to download information, including objects, from said server;
   said server comprising checking means for determining whether said client has an execution environment required for supporting execution of a requested object; and
   transfer means for transferring said requested object to said client when it is determined that said required execution environment exists on said client;
   wherein said transfer means transfers at least one execution environment object from said server to said client when it is determined that said required execution environment does not exist at said client so that said required execution environment objects are transferred to said client, each of said execution environment objects being adapted to support more than one object that may be requested.

37. The data processing system of claim 36, wherein all of said objects are concurrent objects, each executing a single thread of control.

38. The data processing system of claim 36, wherein all of the objects are concurrent objects, each executing a single thread of control.

39. The data processing system of claim 36, wherein said transfer means transfers execution environment objects incrementally to said client in accordance with the needs of said requested object.

40. The data processing system of claim 39, wherein transfer execution environment objects are executed concurrently with the transfer of additional objects.

41. The data processing system of claim 40, wherein a first transferred requested object is executed upon the transfer of said required execution environment objects, and further objects are transferred thereafter.

42. The data processing system of claim 41, wherein objects that are required first for processing are transferred first.

43. The data-processing system of claim 42, further comprising an object for controlling the sequence and timing of the transfer of the desired and execution environment objects.

44. The data processing system of claim 36, wherein said transfer means transfers an updated execution environment object to replace an existing execution environment object if it is determined that said existing execution object includes a performance problem.

45. The data processing system of claim 36, wherein an application program to be executed is generated at said client by utilizing a combination of at least an existing requested object and a newly transferred requested object.

46. The data processing system of claim 36, wherein a particular execution environment object is removed from said client when a next desired object to be transferred to said client does not require said particular execution environment for support.

47. The data processing system of claim 36, wherein said transferred desired object that is no longer required by said client is removed from said client when a new desired object is to be transferred to said client.

48. The data processing system of claim 36, further comprising construction means for constructing an execution environment at said client as a combination of transferred execution environment objects.

49. The data processing system of claim 48, wherein said construction means constructs a second execution environment to support a second desired object, employing at least one execution environment object from said execution environment objects supporting said current desired object.

50. The data processing system of claim 36, wherein said execution environment includes at least:
   a transfer function for transferring an object from said server to said client; and
   a checking function for checking whether said client has execution environment objects required for supporting execution of said requested object.

51. The data processing system of claim 36, wherein said client comprises a plurality of execution environments, comprising at least:
   a device driver execution environment including objects for implementing device drivers;
   a system execution environment including objects for implementing system functions; and
   a core execution environment supporting objects included in the remainder of said plurality of said execution environments.

52. The data processing system of claim 36, wherein said server transfers, via said transfer means, to said client a feature structure including a description of said requested object and said required execution environment, for checking by said server.

53. A data processing device for receiving a plurality of objects from a server comprising:
   first memory means for maintaining a plurality of first objects;
   second memory means for maintaining a plurality of second objects which provide a plurality of application program interfaces (APIs) for each of said first objects;
   means for responding to an inquiry by said server checking whether said data processing device includes required second objects sufficient to support a desired first object to be received by said data processing device;
   means for receiving said desired first object transferred from said server when it is determined by said server that said required second objects exist in said second memory means; and
   means for receiving at least one second object from said server when it is determined by said server that said required second objects are not included in said second memory means, so that said required second objects are transferred to said second memory means, each of said second objects being adapted to support more than one first object that may be maintained in or transferred to said first memory means.

54. The data processing device of claim 53, wherein all of said first and second objects are concurrent objects, each executing a single thread of control.

55. The data processing device of claim 53, wherein all of the first and second objects are concurrent objects, each executing a single thread of control.

56. The data processing device of claim 53, wherein second objects are received incrementally by said means for receiving at least one second object in accordance with the needs of said desired first object.

57. The data processing device of claim 56, wherein transferred second objects are executed concurrently with the transfer of additional objects.

58. The data processing device of claim 57, wherein a first transferred first object is executed upon the transferring of said required second objects, and further first and second objects are transferred thereafter.

59. The data processing device of claim 58, wherein objects that are required first for processing are transferred first.

60. The data processing device of claim 53, wherein an updated second object is transferred to said data processing device to replace an existing second object if it is determined that said existing second object includes a performance problem.

61. The data processing device of claim 53, wherein an application program to be executed is generated by said data processing device by utilizing a combination of at least an existing first object and a newly transferred first object.

62. The data processing device of claim 53, wherein a particular second object is removed from said data processing device when a next desired first object does not require said particular second object's APIs.

63. The data processing device of claim 53, wherein said transferred desired first object is removed from said data processing device when a new desired first object is to be transferred to said data processing device.

64. The data processing device of claim 53, further comprising construction means for constructing an execution environment on said data processing device as a combination of transferred second objects.

65. The data processing device of claim 64 wherein said construction means constructs a second execution environment to provide APIs for a second desired object, employing at least one second object from said second objects providing APIs to said desired object.

66. The data processing device of claim 53, wherein said second memory means includes a plurality of second objects, including at least:
   a device driver second object for implementing device drivers; and
   a system second object for implementing system functions;
   said data processing device further including a core execution environment supporting at least said device driver and said system second objects.

67. The data processing device of claim 53, wherein a feature structure is transferred to said data processing device, said feature structure including a description of said desired first object sufficient to support said desired first object.

* * * * *